US008092932B2

(12) United States Patent
Phillips et al.

(10) Patent No.: US 8,092,932 B2
(45) Date of Patent: Jan. 10, 2012

(54) BATTERY PACK AND INTERNAL COMPONENT ARRANGEMENT WITHIN THE BATTERY PACK FOR CORDLESS POWER TOOL SYSTEM

(75) Inventors: Steven J. Phillips, Ellicott City, MD (US); Daniel J. White, Baltimore, MD (US); Adam M. Casalena, Perry Hill, MD (US); Brent A. Kuehne, Red Lion, PA (US); R. Roby Bailey, Jr., New Park, PA (US); Michael W. Roberts, Jr., York, PA (US); Robert J. Marcinkowski, Cockeysville, MD (US); Michelle L. Bowers, Littlestown, PA (US)

(73) Assignee: Black & Decker Inc., Newark, DE (US)

( * ) Notice: Subject to any disclaimer, the term of this patent is extended or adjusted under 35 U.S.C. 154(b) by 1419 days.

(21) Appl. No.: 11/552,847

(22) Filed: Nov. 20, 2006

(65) Prior Publication Data

US 2008/0220324 A1 Sep. 11, 2008

Related U.S. Application Data

(60) Provisional application No. 60/731,269, filed on Oct. 31, 2005, provisional application No. 60/731,486, filed on Oct. 31, 2005, provisional application No. 60/836,396, filed on Aug. 9, 2006.

(51) Int. Cl.
*H01M 2/10* (2006.01)

(52) U.S. Cl. .......................................... 429/100; 429/96

(58) Field of Classification Search ........................ None
See application file for complete search history.

(56) References Cited

U.S. PATENT DOCUMENTS

| 5,923,530 | A | * | 7/1999 | Murayama et al. ...... 361/679.09 |
| 5,928,020 | A | * | 7/1999 | Bishop et al. .................. 439/188 |
| 6,399,238 | B1 | * | 6/2002 | Oweis et al. .................... 429/99 |
| 6,472,098 | B1 | * | 10/2002 | Sawada et al. ................ 429/163 |
| 6,645,669 | B2 | * | 11/2003 | White et al. ................... 429/158 |
| 6,783,886 | B1 | * | 8/2004 | Sakakibara et al. ............. 429/99 |
| 7,589,500 | B2 | * | 9/2009 | Johnson et al. ............... 320/134 |
| 2005/0110458 | A1 | * | 5/2005 | Seman et al. .................. 320/114 |
| 2006/0040173 | A1 | * | 2/2006 | Shimamura et al. ............ 429/99 |
| 2008/0254356 | A1 | * | 10/2008 | Liersch et al. ................. 429/160 |

FOREIGN PATENT DOCUMENTS

EP 1 662 632 A1 5/2006
WO WO 2005/039012 4/2005

OTHER PUBLICATIONS

European Search Report issued Mar. 21, 2007 in corresponding European Patent Application No. 06123221.

* cited by examiner

*Primary Examiner* — Barbara Gilliam
*Assistant Examiner* — Maria J Laios
(74) *Attorney, Agent, or Firm* — Harness, Dickey & Pierce, P.L.C.

(57) ABSTRACT

An internal component arrangement within a battery pack housing having multiple cells and adapted for cordless power tools may provide desired mechanical support to constrain the cells. The housing with internal component arrangement is configured to route sensing wires from the cells to an electronics module of the pack.

31 Claims, 18 Drawing Sheets

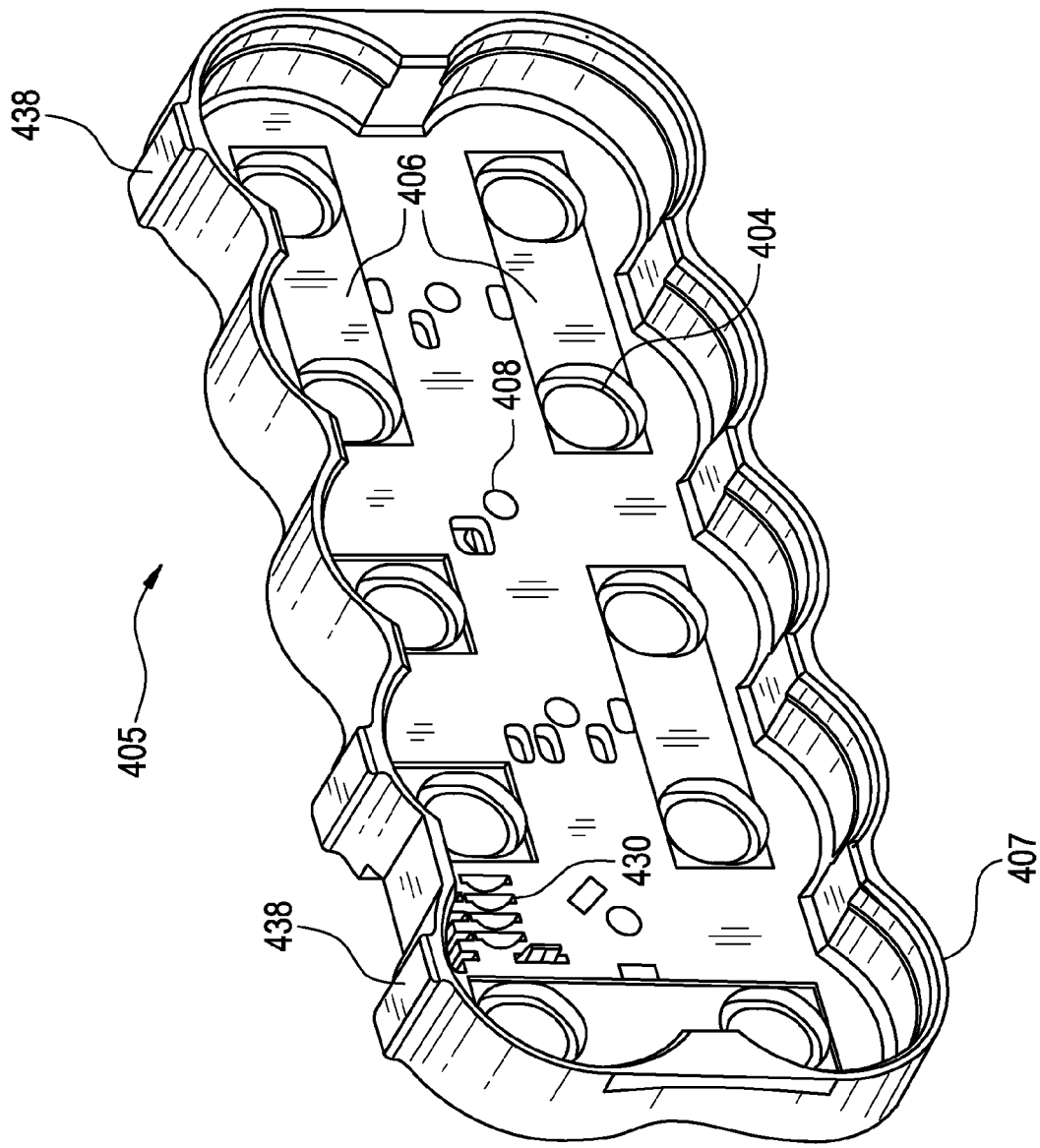

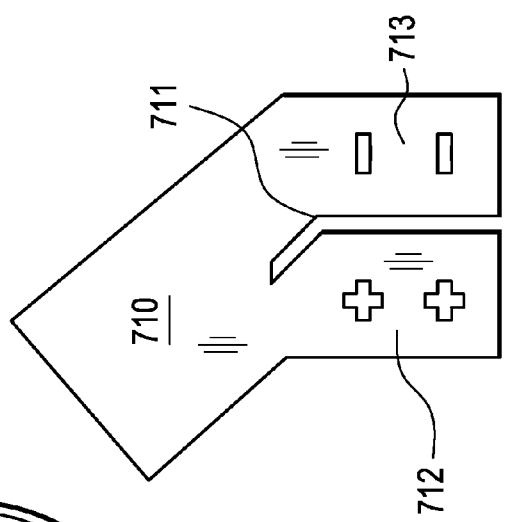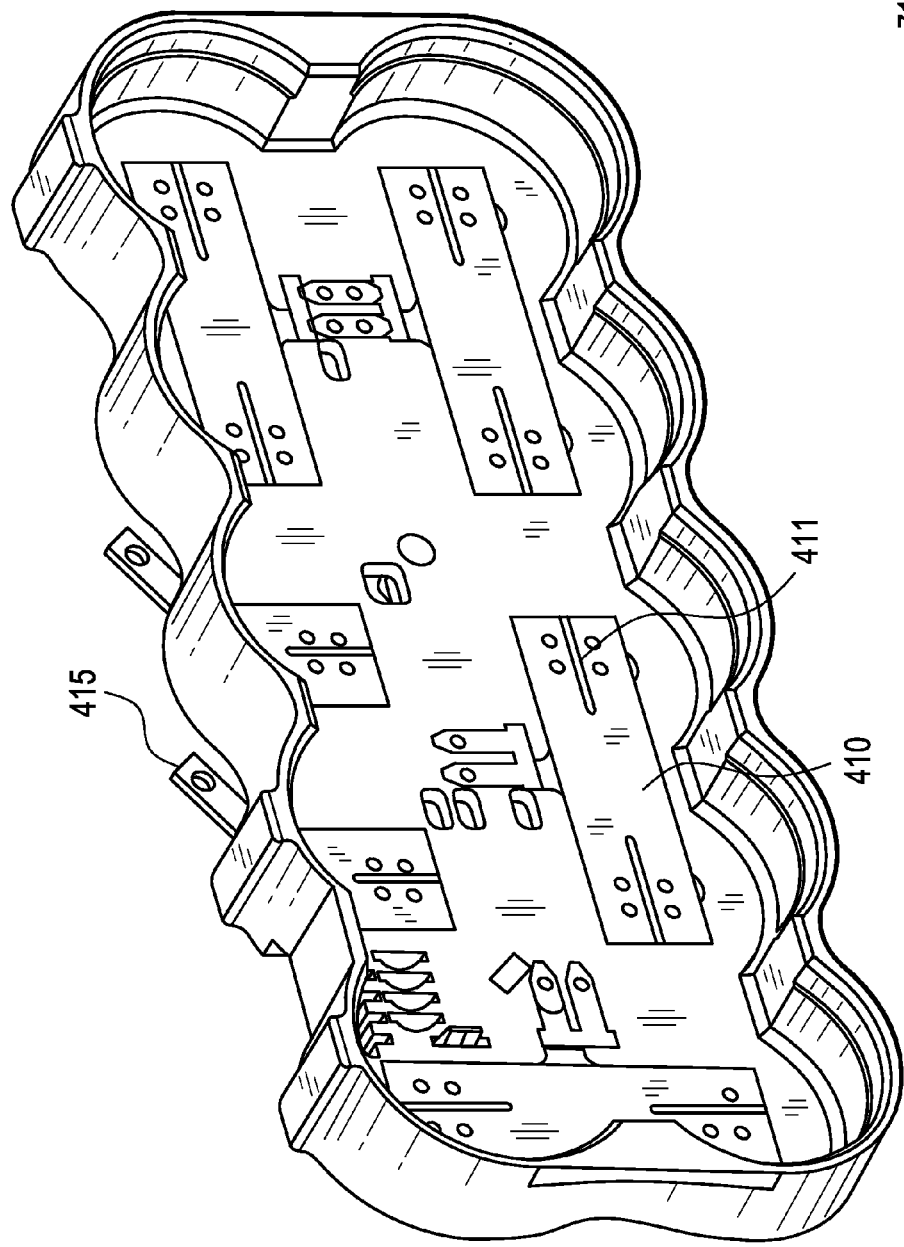

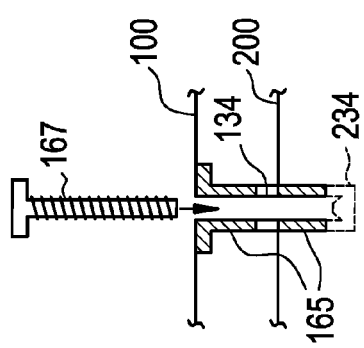
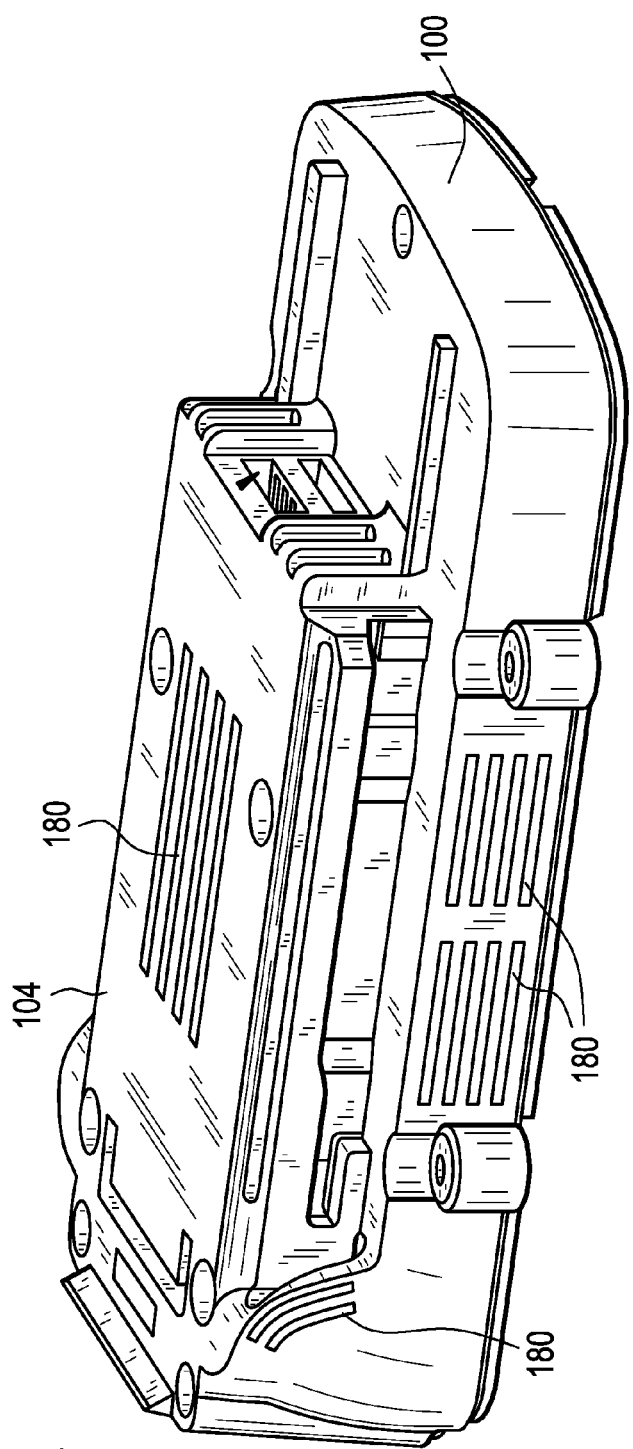

BATTERY PACK AND INTERNAL COMPONENT ARRANGEMENT WITHIN THE BATTERY PACK FOR CORDLESS POWER TOOL SYSTEM

PRIORITY STATEMENT

This application claims the benefit under 35 U.S.C. §119 (e) to the following U.S. Provisional Patent Application Ser. No. 60/731,269, filed Oct. 31, 2005 to Daniel J. White et al. and entitled "BATTERY PACK FOR CORDLESS POWER TOOLS", Ser. No. 60/731,486 filed Oct. 31, 2005 to Steven J. Phillips et al. and entitled "BATTERY PACK INTERNAL COMPONENT ARRANGEMENT"; and Ser. No. 60/836, 396 filed Aug. 8, 2006 to Steven J. Phillips et al. and entitled "WELD STRAP IMPROVEMENTS FOR BATTERY CELLS". The entire contents of each of these provisional applications are hereby incorporated by reference herein.

BACKGROUND

1. Field

Example embodiments in general relate to a battery pack configured for powering tools of a cordless power tool system having an arrangement of internal components within a housing thereof, to an internal component arrangement for a battery pack and to a methodology for arranging the internal components within the battery pack.

2. Description of Related Art

Cordless products or devices which use rechargeable batteries are prevalent throughout the workplace and home. Rechargeable batteries may be used in numerous devices, from computer products and/or housewares to power tools. Nickel-cadmium, nickel-metal-hydride battery and/or lithium-ion cells may be used in these devices. Since the devices use a plurality of battery cells, the battery cells may be ordinarily packaged as battery packs. These battery packs may be coupled with the cordless devices so as to secure the pack to the device. The battery pack may be removed from the cordless device and charged in a battery charger or charged in the cordless device itself, for example.

As battery technologies become more advanced, it is increasingly desirable to have intelligent battery packs for these cordless devices, such as cordless power tools, which are capable of self-monitoring. This self-monitoring feature necessitates electronics and sensors to be disposed within the battery pack. Current battery pack designs, such as those designed for cordless power tools and associated chargers of a cordless power tool system, do not typically provide an adequate support structure/housing to mechanically retain all of these components and the battery cells.

For example, in a multiple cell battery pack, there is a need to electrically connect cells to one another. This is typically accomplished by welding electrically conductive cell straps between cells. These weld joints, which occur between the cell cans and the electrically conductive straps, are critical to the operation and performance of the battery pack. Because of the importance of these welds, the manufacturing process should be tightly controlled.

A bad weld can result in an open-circuited battery pack, which can be detected by an end of line tester and either scrapped or re-worked, increasing fabrication cost. A marginal weld could fail in the field, either causing an open circuited pack or a high-impedance pack. The user would either notice a non-functional battery pack or a pack with decreased performance.

The manufacturing process of locating and restraining the multitude of straps needed for fabricating an individual battery pack can be difficult, requiring additional fixtures and cost. Conventionally, the manufacturer creates a jig to hold the cells in position and another fixture (or mask) to hold the straps in position relative to the cells during welding. Once the welds are complete, the mask and the jig are removed and the resulting "core-pack" (e.g., cells held together by their welded cell straps) is inserted into its housing.

This manufacturing technique may cause residual stresses on the weld joints. The cells are constrained in one position while in the manufacturing jig. The welds are applied with the cells constrained in one position while in the manufacturing jig. The jig is then removed and the cells are free to move. Then the cells are inserted into a pack housing, forcing the cells into a different position or orientation. In other words, the positioning of the cells in the pack housing may not be exactly the same positioning with which the cells were welded, which places stresses on the weld joints at strap-to-can interfaces. During operating of the pack in a system, such as when attached to a cordless power tool, and upon operation-induced vibration and/or accidental dropping of the tool, these weld joints are more likely to fail because of residual stresses introduced during the assembly of the internal components within the pack housing.

Further, a smart battery pack typically may require a plurality of signal-level conductors throughout the battery pack. These conductors carry information about the status of the pack to a control unit in the pack which may be a microprocessor or microcontroller. Because this information is gathered from different locations within the battery pack, the wire-up of these conductors can pose a challenge to manufacturers.

As an example, in a smart battery pack capable of self-monitoring, each cell's voltage is individually monitored by a controller in the pack, such as a microprocessor, microcontroller, etc. This requires that each cell be wired up to the controller. Because of the low current nature of these signals, thin gage wire could be used as the signal-level conductors, as it takes up less space within the pack. Using thin gage wire, however, presents challenges in a power tool environment. A power tool battery pack can experience high vibration in operation, such as during operation of a cordless reciprocating saw as well as severe mechanical shock, such as a user dropping a tool off of a multistory building. These scenarios are likely to lead to failure of thin gage wire that is soldered or ultrasonically welded (or otherwise rigidly attached) to the cells.

SUMMARY

An example embodiment is directed to a battery pack for a cordless power tool. The pack includes a top housing supporting an electronic module and a battery terminal block connected to the electronics module, and a bottom housing containing a plurality of battery cells constrained between a pair of end caps. Each end cap includes a plurality of sense wires extending across an outer surface thereof and electrically connected between a corresponding cell and the electronics module.

Another example embodiment is directed to an internal component arrangement within a battery pack of a cordless power tool. The pack includes a top housing and bottom housing. The arrangement includes a plurality of battery cells disposed in the bottom housing, a pair of end caps constraining the cells between inner surfaces of the end caps, and a plurality of sense wires extending across an outer surface of each end cap. Each sense line includes a first end electrically connected to an electronics module in the top housing and a second end electrically connected to a corresponding cell between the end caps.

Another example embodiment is directed to a method or arranging a plurality of internal components with a battery pack housing. In the method, a pair of end caps is provided. Each end cap includes a plurality of spaced apart recesses formed on an inner surface thereof which are shaped to receive a plurality of cell straps and a pair of power terminal leads. Each end cap includes a plurality of spaced apart access holes, each access hole extending through a corresponding recess formed in the inner surface.

The cell straps and leads are placed within the spaced apart recesses so that a portion of each cell strap or power lead is exposed through a corresponding access hole. A plurality of cylindrical battery cells are disposed between the end caps so that ends of corresponding cells contact a given cell strap or lead at a junction that is exposed through a corresponding access hole. The sides of the end caps have a scalloped shape that conforms to the rounded shape of the cylindrical cells to constrain the cells there between. The cell straps and power leads are welded to the cells through the access holes to form a core pack comprised of the cells connected to the straps and leads between the end caps. A plurality of sense wires are attached within outer surfaces of the end caps in the core pack. One end of each sense line is a spring end which is retained within a corresponding access hole of the core pack to contact a junction of a cell strap/battery cell, and the other end of each sense line is attached to an integrated connector formed in each end cap of the core pack. The core pack is then inserted into the housing.

BRIEF DESCRIPTION OF THE DRAWINGS

The example embodiments of the present invention will become more fully understood from the detailed description given herein below and the accompanying drawings, wherein like elements are represented by like reference numerals, which are given by way of illustration only and thus are not limitative of the example embodiments of the present invention.

FIG. 6 illustrates an end cap of the subassembly.

FIG. 7A illustrates the attachment of cell straps to an inside surface of a given end cap.

FIG. 7B illustrates an example construction of a cell strap with a jogged slit.

FIG. 17 is a partial cross section of a connection point between the top and bottom housing to illustrate the use a vibration dampening components in the pack.

FIG. 18 is a side view of the top housing to illustrate vents in the example battery pack.

DETAILED DESCRIPTION OF THE EXAMPLE EMBODIMENTS

Figure 1:
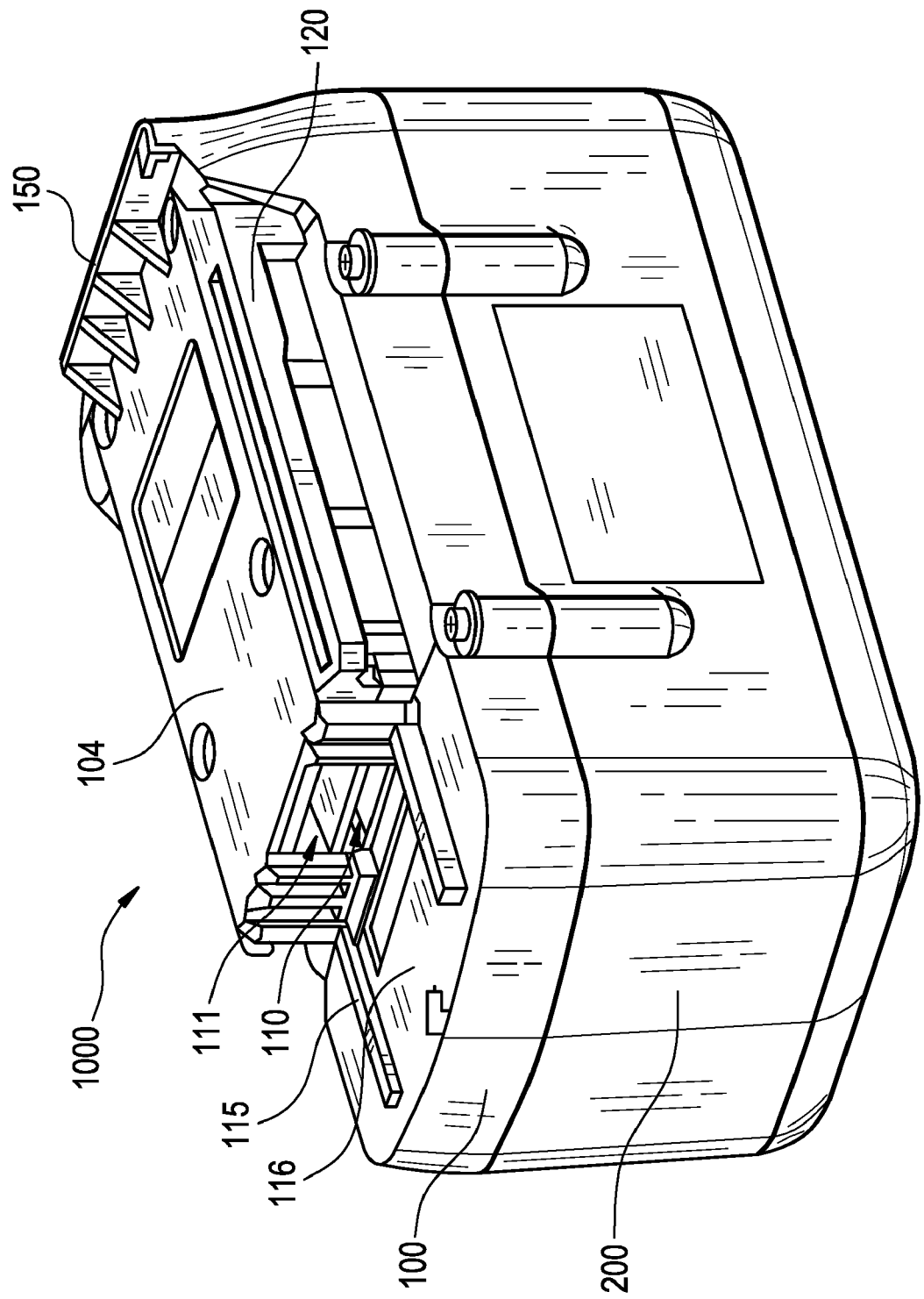
FIG. 1 is a perspective view of a battery pack adapted for providing power to a cordless power tool in accordance with an example embodiment of the present invention.

With general reference to the drawings, a system of cordless power tools constructed in accordance with the teachings of example embodiments of the present invention is illustrated. Example cordless power tools of the system are shown to include, by way of examples only, a circular power saw 10 (FIG. 14), a reciprocating saw 20 (FIG. 15) and a drill 30 (FIG. 16). The tools 10, 20 and 30 each may include a conventional DC motor (not shown) adapted to be powered by a power source having a given nominal voltage rating.

Tools 10, 20 and 30 may be driven by a removable power source having a nominal voltage rating of at least 18 volts. It will become evident to those skilled that the present invention is not limited to the particular types of tools shown in the drawings nor to specific voltages. In this regard, the teachings of the present invention may be applicable to virtually any type of cordless power tool and any supply voltage.

With continued reference to the drawings, the removable power source which may be embodied as a battery pack 1000. In the example embodiments illustrated, the battery pack may be a rechargeable battery pack 1000. Battery pack 1000 may include a plurality of battery cells connected in series, and/or a plurality of serially-connected strings of cells, in which the strings are in parallel with one another.

For purposes of describing example embodiments of the present invention, battery pack 1000 may be composed of cells having a lithium-ion cell chemistry. As the example embodiments are directed to the cordless power tool environment, which requires power sources having much higher voltage ratings than conventional low voltage devices using Li-ion battery technology, (such as laptop computers and cellular phones) the nominal voltage rating of the battery pack 1000 may be at least 18V.

However, pack 1000 may be composed of cells of another lithium-based chemistry, such as lithium metal or lithium polymer, or other chemistry such as nickel cadmium (NiCd), nickel metal hydride (NiMH) and lead-acid, for example, in terms of the chemistry makeup of individual cells, electrodes and electrolyte of the pack 1000.

As will be explained in further detail below, an example embodiment of the present invention is directed to an internal component arrangement within a housing of a battery pack adapted for cordless power tools. The arrangement addresses the above conventional problems in assembling battery packs for power tools in which the packs include multiple cells and associated electronics or intelligence. The internal component arrangement within the battery pack provides desired mechanical support to constrain the cells, route and constrain sensing wires from the cells to an electronics module, to constrain an electronics module in the pack, and to provide a means of interfacing all of these components within a battery pack housing.

In an example, the arrangement includes a plurality of cells configured between end caps. The end caps may have recesses on an interior surface thereof for receiving cell straps. The cell straps may be laser welded to the cells through apertures in the end caps. In another example, the cell straps may be resistance welded to the end caps.

In an example, exterior surfaces of each end cap may include pre-formed channels for receiving sense wires and a corresponding pre-formed connector for receiving terminal ends of the sense wires. The connector may mate with a female connector to provide cell data to an separate electronics module within the battery pack housing.

In an example, a distal end of the sense wires may be configured as a compressible spring that is insertable through the end cap aperture so as to be in secure, connective engagement with strap/cell to provide sensed readings of the cells to the electronics module.

In an example, a top housing of the battery pack may house the electronics module. The electronics module is separate from the internal component arrangement of cells between end caps with voltage sense wires in the end caps and connectors in the end caps. The electronics module includes a potting boat acting as a heat sink for and housing a PCB containing the battery pack electronic components. The sense wires of the end caps, which are connected to the cells, may be in turn electrically connected to the electronics module via suitable connectors and wiring harnesses.

Figure 2:
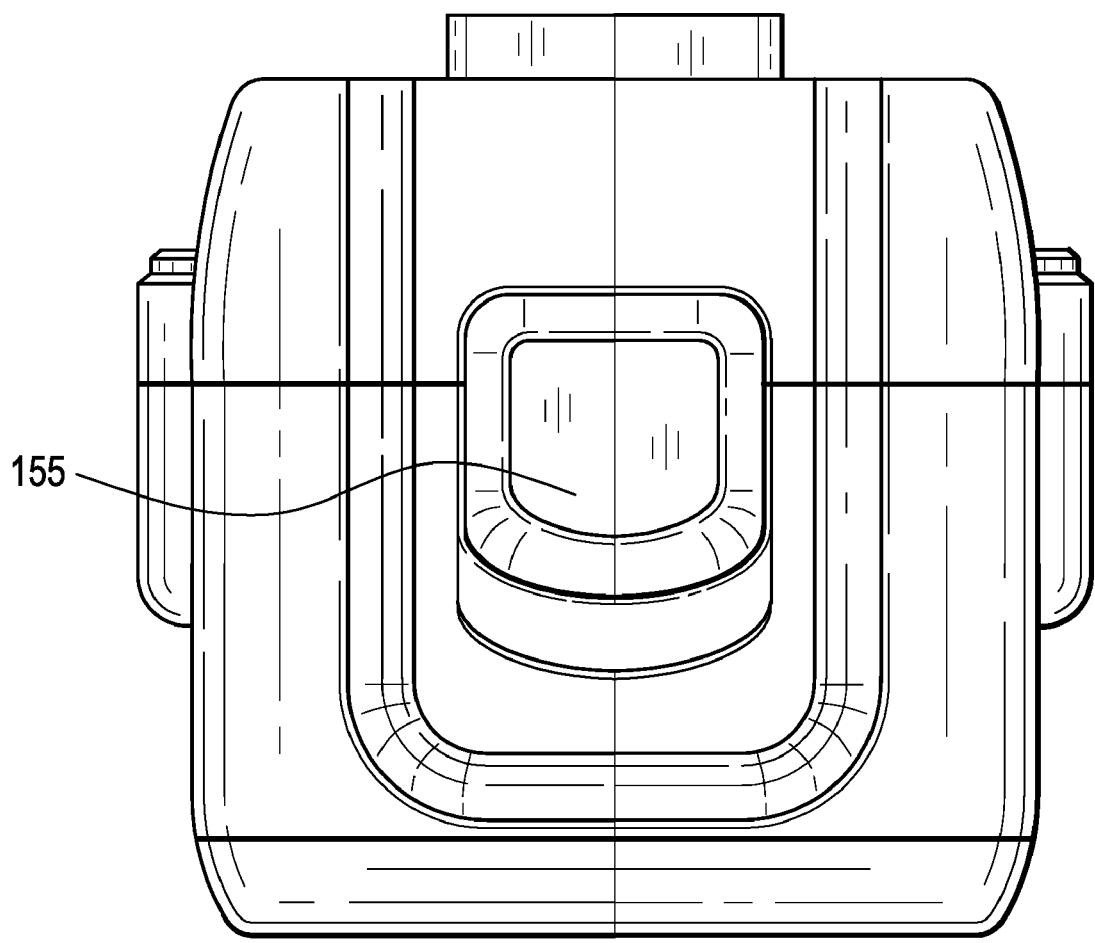
FIG. 2 is a rear view of the battery pack of FIG. 1.
Figure 14:
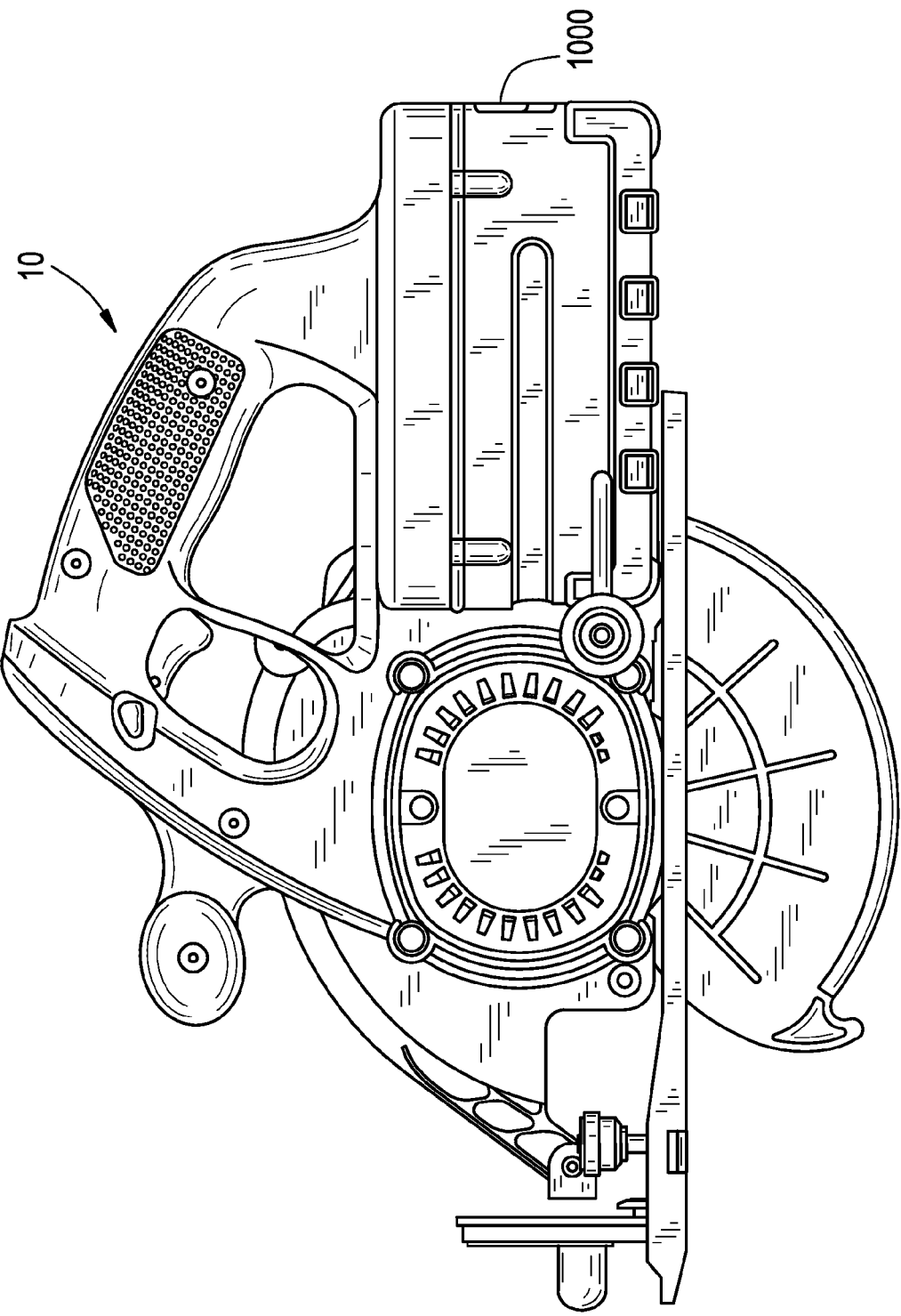
FIGS. 14-16 illustrate illustrative cordless power tools of a cordless power tool system in accordance with an example embodiment of the present invention.
Figure 15:
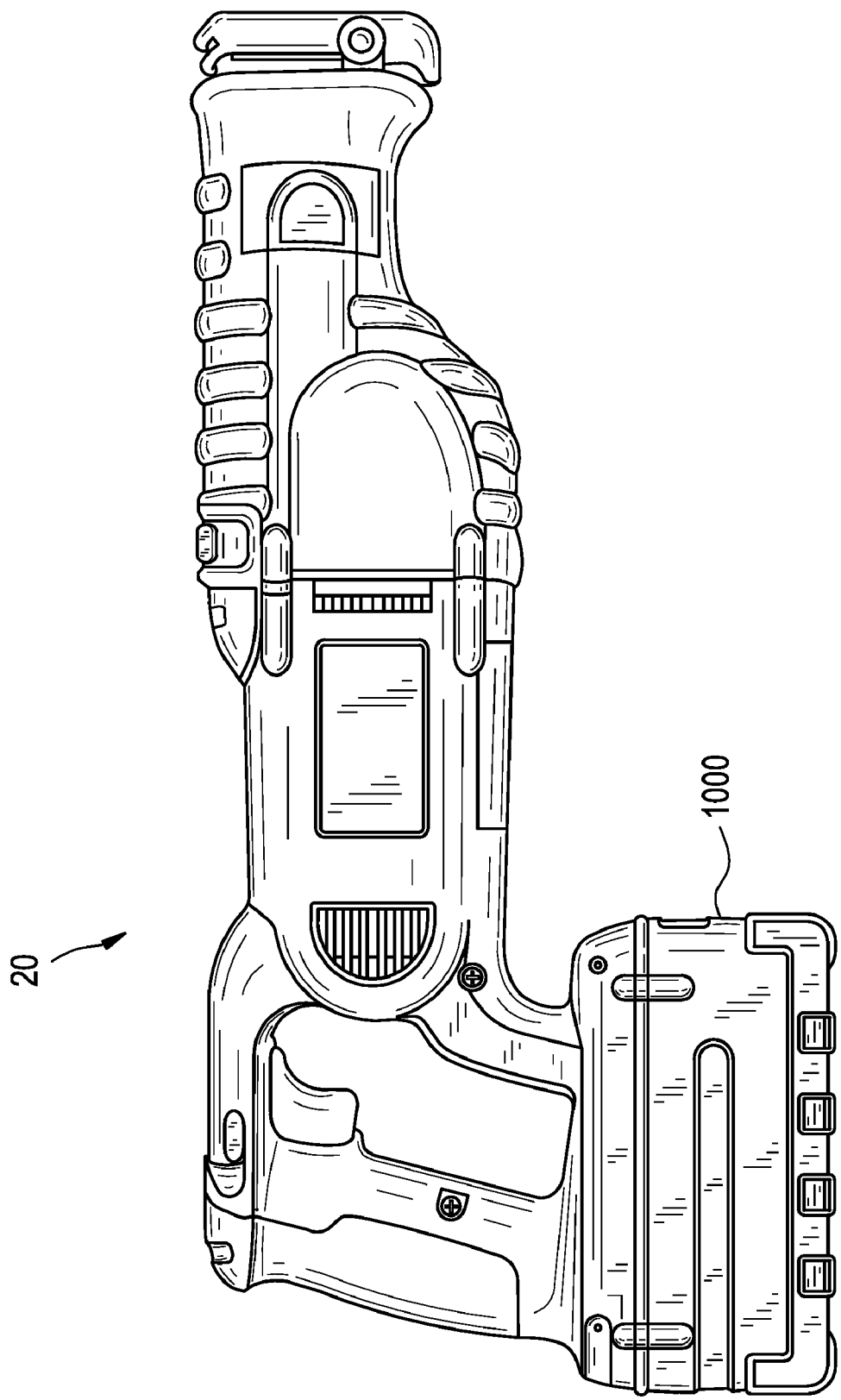
Figure 16:
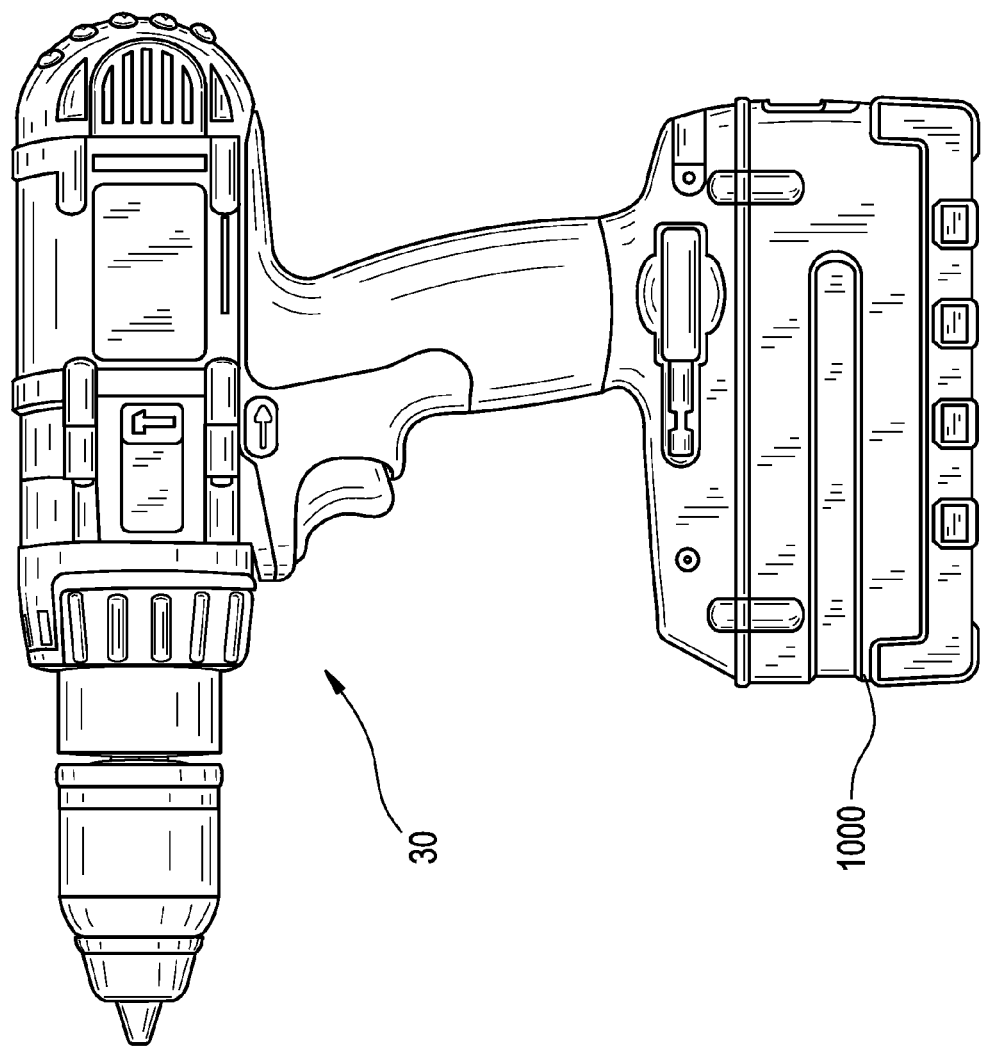

FIG. 1 is a perspective view of a battery pack adapted for providing power to a cordless power tool such as shown in any of FIGS. 14-16 in accordance with an example embodiment of the present invention, and FIG. 2 is a rear view of the battery pack of FIG. 1. FIG. 1 thus illustrates an example battery pack 1000 that may be formed in accordance with the example embodiments to be described hereafter. Pack 1000 includes a housing comprising a top housing 100 and a bottom housing 200, joined as shown generally in FIG. 1. The top housing 100 and bottom housing 200 may be each unitarily constructed from a rigid plastic or other suitable material such as ABS.

Figure 12:
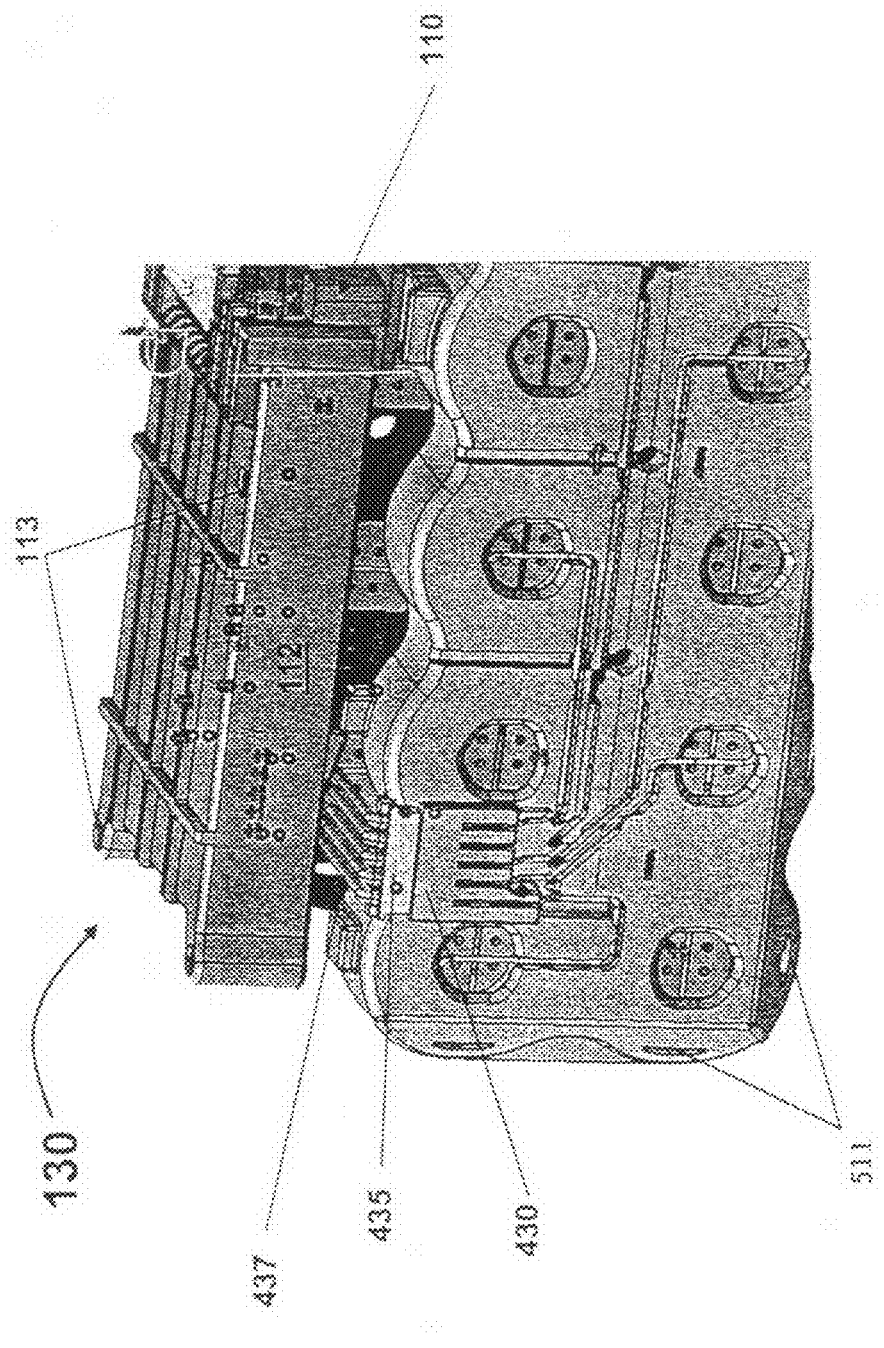
FIG. 12 is a partial view of the pack internals illustrating electrical connection between the end caps and the electronics module.
Figure 13:
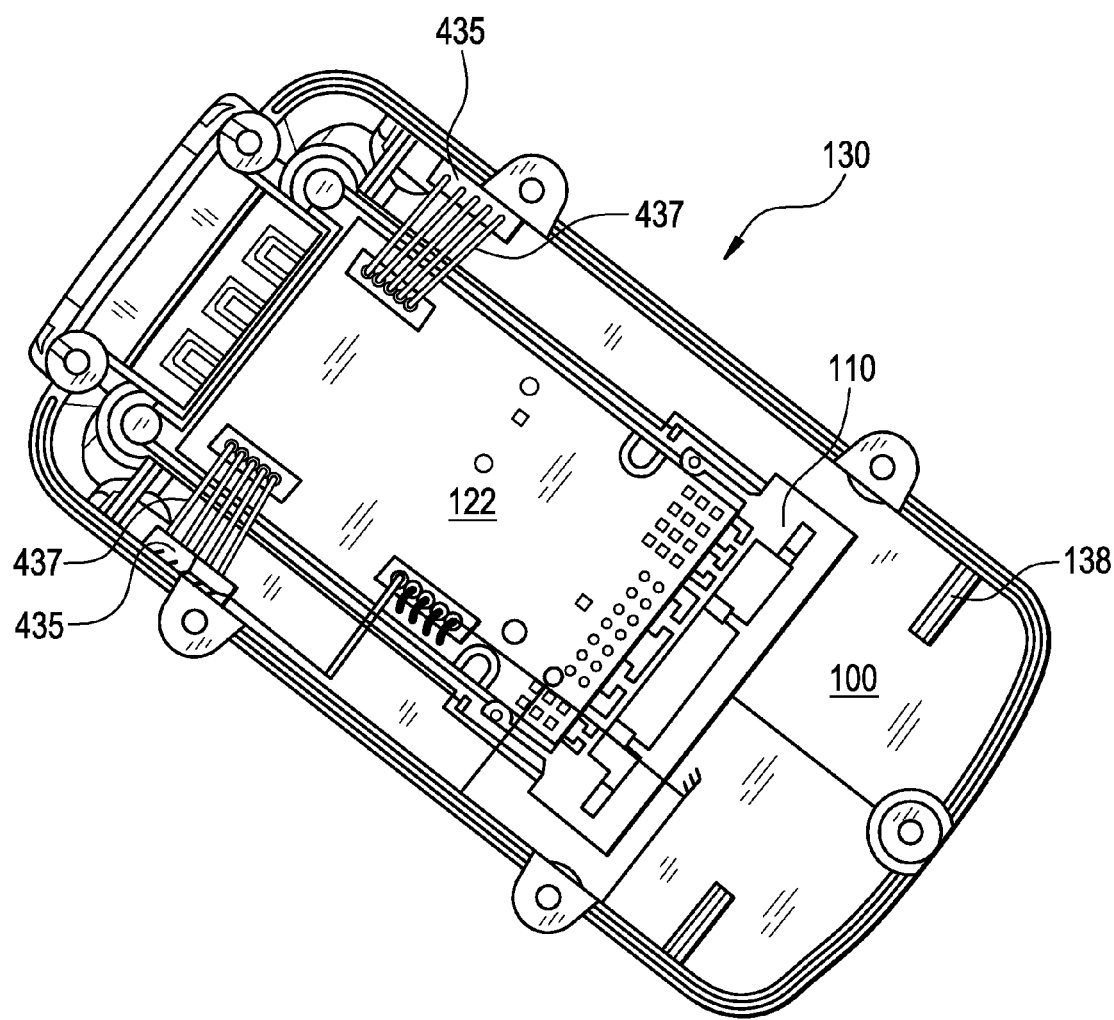
FIG. 13 is a bottom view of top housing so as to illustrate the arrangement of the electronics module therein.

Occasional reference should be made to FIGS. 12 and 13 for the following discussion. Top housing 100 includes an upper portion 104 which provides a recessed area on an interior side thereof (not shown) for housing an electronics module 130. As illustrated in detail below in FIGS. 12 and 13, the electronics module 130 is supported within a potting boat 112 that serves as a heat sink. The electronics module 130 supported by the potting boat 112 may be attached to a battery pack terminal block (T-block) 110 that is shown within an opening 111 of top housing 100. The exact terminal or contact configuration of T-block 110 is not a focus of the present invention, thus a detailed description is omitted for purposes of brevity.

Top housing 100 also includes lateral guide rails 120 which are designed to slidably engage to cooperating channels within a suitable tool housing (or charger housing) for securing the pack 1000 to the tool or charger. Alignment guide rails 115 are provided on a front surface 116 of the top housing 100 for ensuring centering alignment with a tool or charger terminal block. The specific engagement of alignment guide rails 115 and lateral guide rails 120 are not a focus of the present invention, thus a detailed explanation is omitted.

Pack 1000 includes a latch 150 configured as a release mechanism for releasing the battery pack 1000 from a power tool or charger. As shown in FIG. 2, an operator can release the battery pack 1000 from the power tool or charger by depressing a latch release button 155 disposed through a rear opening 156 of the pack 1000. The latch 150 and release button 155 may be a single integrally-molded piece, for example. By depressing the latch release button 155, the latch 150 is urged from a "lock" position (where engagement of latch into a recess area within a battery pack receiving portion of a corresponding tool or charger locks the pack to the tool or charger) to a "release" position. In the release position, the latch release button 155 is actuated downward to overcome spring pressure (spring not shown) so that latch 150 no longer obstructs the recess area (not shown) in the tool or charger. Thus, the battery pack 1000 can be removed from a battery pack receiving portion of a power tool or charger by depressing the latch release button 155.

The battery pack 1000 having been described in general terms, constituent internal components and processes for constructing an internal component arrangement within the battery pack housing are now described. The following discussion may include a description of features that assist in mechanically and structurally supporting the battery cells and electrical connectors from the cells to the electronics module within the pack 1000.

Figure 3:
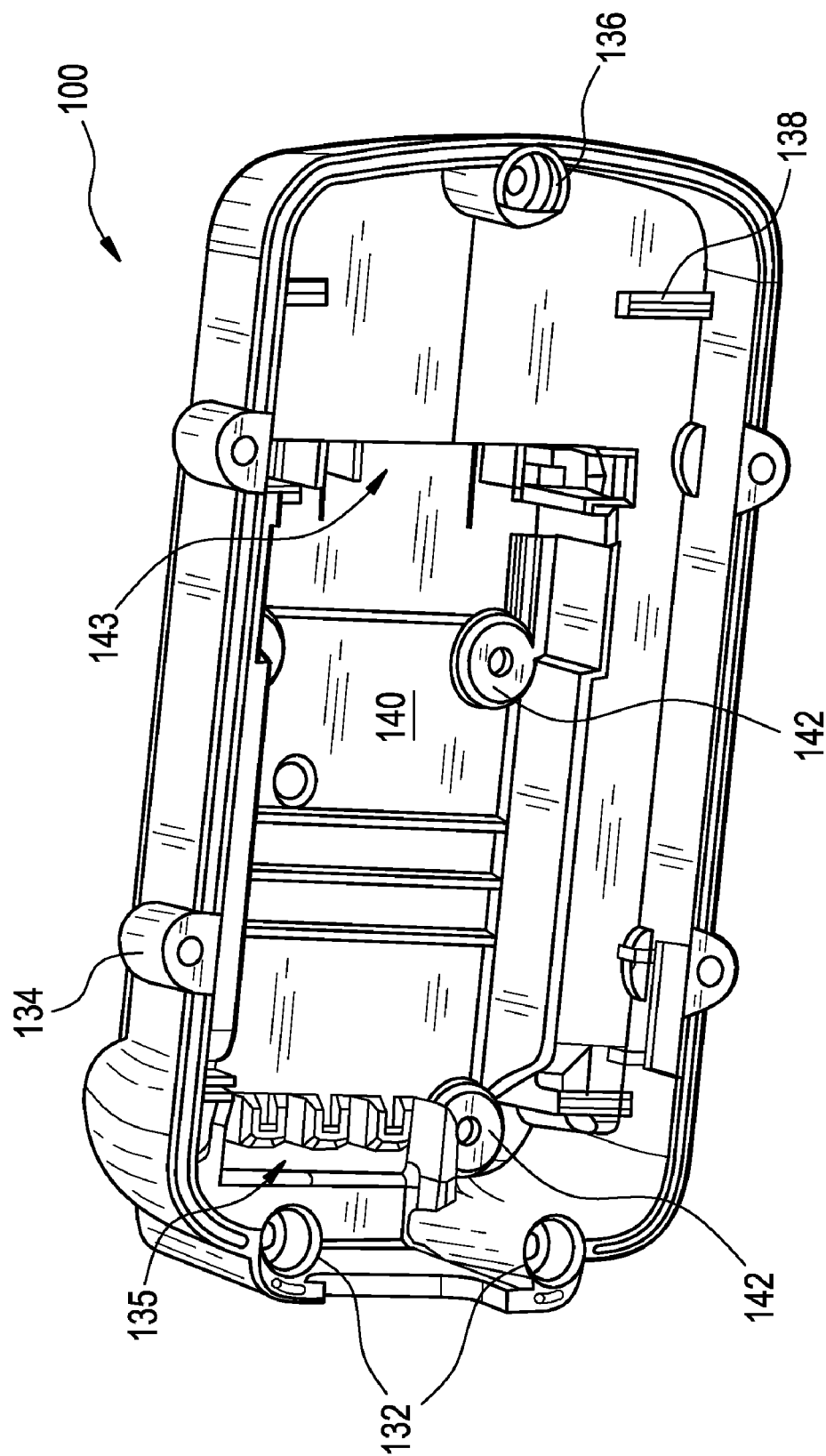
FIG. 3 is a bottom view illustrating an interior portion of the upper housing of the battery pack of FIG. 1.
Figure 4:
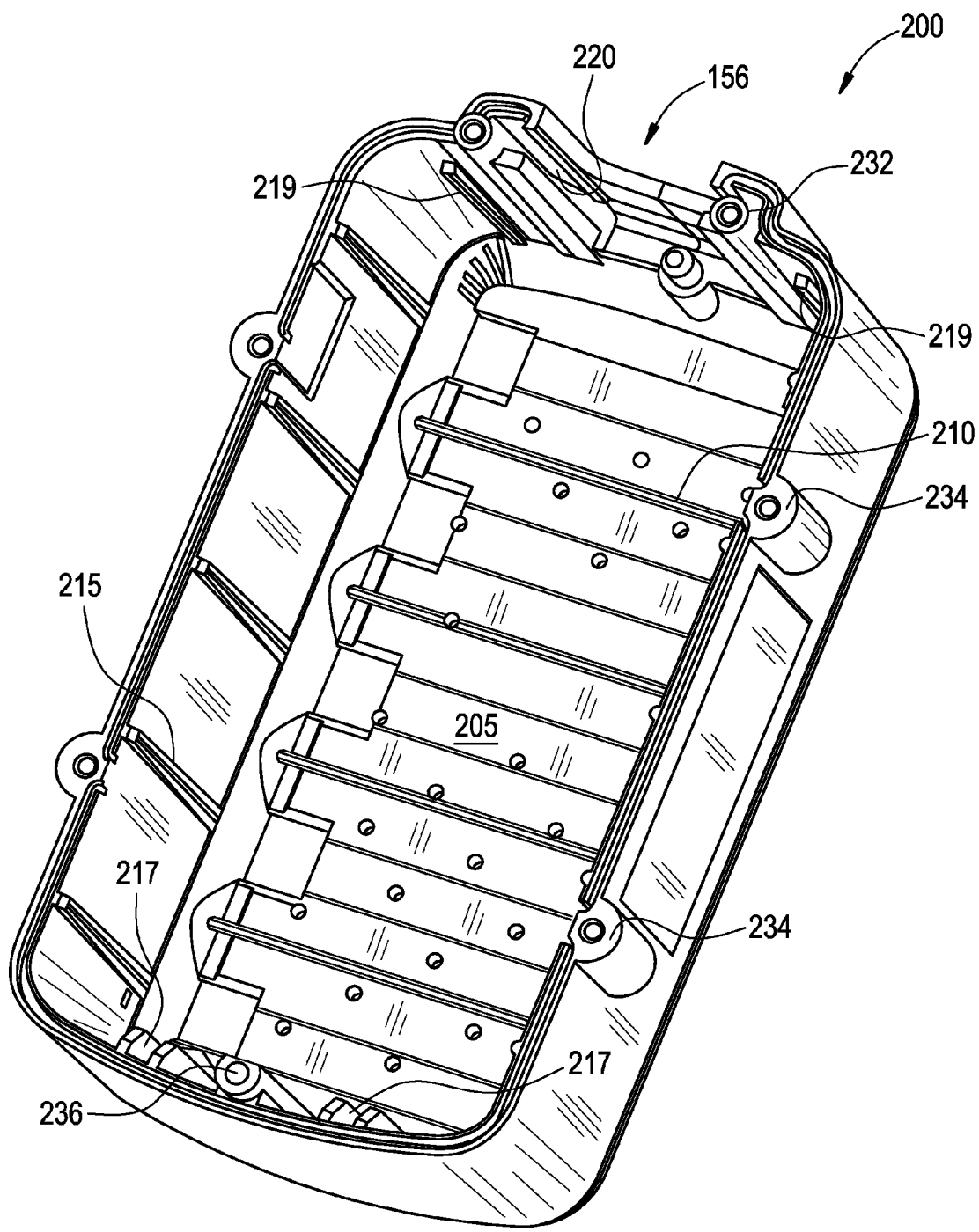
FIG. 4 is a top view illustrating an interior portion of the lower housing of the battery pack of FIG. 1.

FIG. 3 is a bottom view illustrating an interior portion of the upper housing of the battery pack of FIG. 1, and FIG. 4 is a top view illustrating an interior portion of the lower housing of the battery pack of FIG. 1. Referring to FIGS. 3 and 4, both the top housing 100 and bottom housing 200 include a plurality of spaced and aligned screw bosses adapted for threaded type fasteners to fasten the housing halves together. As shown, top housing 100 includes a pair of rear screw bosses 132 configured with through holes and corresponding to rear screw bosses 232 on bottom housing 200. On each side, sidewall screw bosses 134 of top housing align to corresponding sidewall screw bosses 234 of bottom housing 200, and front screw boss 136 aligns to front screw boss 236 of the bottom housing 200. When aligned, each screw boss pair provides a threaded through bore or opening for receiving mechanical fasteners such as housing screws to fasten the housing halves 100, 200 together.

Referring to FIG. 3, the top housing 100 includes a slot 135 that permits latch 150 to project there through. Top housing 100 includes a recessed area 140 (e.g., the area within upper portion 104 in FIG. 1) that is configured to fixedly secure the potting boat with electronics module therein, such that the battery pack T-block 110 is aligned within an opening (not shown) in FIG. 3. The potting boat is secured within recessed area 140 by a plurality of fasteners through corner module screw bosses or apertures 142 (only 2 of 4 shown in FIG. 3).

Referring to FIG. 4, bottom housing 200 may be characterized by having a plurality of separator ribs 210 on a bottom surface 205 thereof, which conforms generally to the width of a given can housing a battery cell so as to limit cell vibration. Moreover, separator ribs 210 may be used for alignment of end caps (to be described in detail below) so that the end caps and cells rest evenly on bottom surface 205, provided an even distribution of weight. Bottom housing 200 may also have a pair of spaced guide channels 220 for receiving the latch 150 and release 155 assembly.

Additionally, there is provided a plurality of sidewall ribs 215 offset from the separator ribs 210, a plurality of front support ribs 217 at the forward end of the bottom housing 200, and a pair of rear support ribs 219 at the rear end, one rib 219 each outboard of the rear opening 156 and the rear screw bosses 232 of bottom housing 200. Each sidewall rib 215, front support rib 217, and rear support rib 219 may be characterized as being thickest at its upper end toward the top of the bottom housing 200, and gradually tapering downward to where the rib becomes flush with an interior wall surface of bottom housing 200. The plurality of ribs 210, 215, 217, 219 may be injection molded along with the formation of the bottom housing 200. In an example, the thickness or depth of the sidewall ribs 215 may differ from the thickness of rear support ribs 217 and front support ribs 219 at the respective upper ends. In another example, rear support ribs 217 may be thicker at the top of bottom housing 200 than sidewall ribs 215, which in turn may be thicker than front support ribs 219 at their respective upper ends. In a further example, a given side of the bottom housing 200 may have two or more ribs having different dimensional sizes, e.g., different lengths, widths, depth to wall surface, etc.

The plurality of ribs 210, 215, 217 and 219 are pressed against the battery cells to prevent and/or reduce the bottom housing 200 from creating a high pressure point on a given battery cell during a drop or impact. During a drop or impact of the battery pack 1000, certain cells within the bottom housing 200 may be sufficiently deformed, e.g., the can housing the cell becomes kinked or deformed. This could cause a short circuit inside a cell which could result in either malfunction, decreased cycle life of the cell, decreased run time of the cell, etc. The plurality of ribs 210, 215, 217 and 219 arranged around the periphery of the sidewalls and bottom surface 205 of the housing 200 ensure that each battery cell may be met at multiple points of contact if the pack 1000 is dropped. The multiple points of contact increase the surface area where the ribs are in contact with a given cell, which may reduce the pressure created on the cell. Accordingly, the plurality of ribs 210, 215, 217, 219 contact the battery cells at multiple locations to reduce and/or prevent kinks created by a drop or impact of the battery pack 1000.

FIG. 17 is a partial cross section of a connection point between the top and bottom housing to illustrate the use a vibration dampening components in the pack 1000. In FIG. 17, there is shown a portion of the pack where the sidewall screw bosses 134 and 234 are aligned to permit the pack housings 100, 200 to be secured through openings or through bores with a plurality of fasteners 167. As shown the fastener 167 may be embodied as a screw. The connective arrangement shown in FIG. 17 is the same for alignment of the front and rear screw bosses for connecting the two housings 100, 200.

Referring to the example shown for the sidewall screw bosses 134 and 234, the fasteners 167 are insertable into aligned holes or through bores formed by the alignment of the bosses 134 and 234. In an example, grommets 165 may be inserted into these openings or through bores in the screw bosses 134, 234 to reduce the vibration and impact due to dropping of the pack 100. The grommets 165 also isolate and absorb the vibration and impact, and reduce the transmission of the vibration to terminal portions of the battery pack 1000, such as to battery-to-tool interfaces, for example. The grommets 165 may also be used for reinforcement, to shield cover sharp edges formed by the hole, and/or both. The grommets 165 may be formed from a rubber material. However, it should be appreciated that other materials may be employed, such as plastic and/or metal.

FIG. 18 is a partial side view showing the top housing 100 to illustrate the inclusion of vents in the example battery pack 1000. In another example, the top housing 100 may include vents 180 or cut-outs formed along side portions and on upper portion 104 of the top housing 100 to vent elevated temperatures due to the electronics and cells 402 inside the pack 1000 to the outside ambient air.

Figure 5:
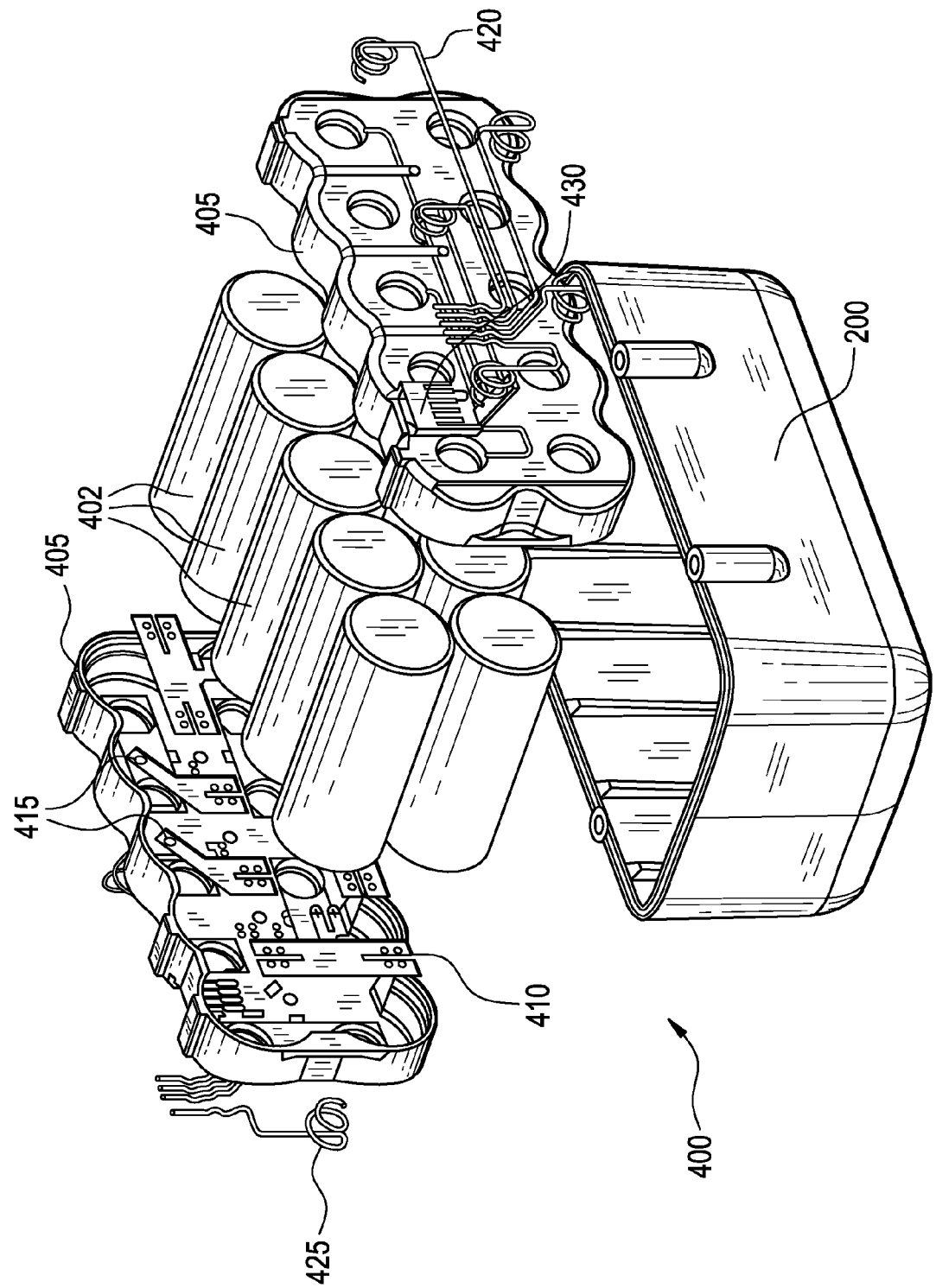
FIG. 5 is an exploded view illustrating a subassembly of internal components of the battery pack within the lower housing of the battery pack.

FIG. 5 is an exploded view illustrating an internal component arrangement within the bottom housing 200 of the battery pack. As shown in FIG. 5, an internal component arrangement 400 for pack 1000 may include providing a plurality of cylindrical battery cells 402 between end caps 405. Each cell 402 is housed in what is referred to as an enclosure or "can"; the can represents the outer shell of the cell 402 and may be steel or aluminum, for example. Accordingly, for ease of explanation cell 402 hereafter refers to a can which houses a cell therein. A typical battery cell 402 may be configured as having a separator provided between a positive electrode (cathode) and negative electrode (anode) in a spiral round configuration, which is an electrode structure of high surface area created by winding the electrodes and separator into a spiral-wound, jelly-roll configuration. Cylindrical cells 402 thus may be characterized as having a jelly roll configuration.

The end caps 405 serve as a backbone to support all of the smart battery components. The end caps 405 could be constructed of a plastic such as a PC/ABS blend, for example. Alternatively, the end caps 405 could be formed of an appropriate heat sinking material, such as aluminum, to aid in the thermal management of the battery cells 402.

As will be explained in further detail below, each end cap 405 is configured with cell straps 410 on an inner surface thereof that connects each of the cells 402 to power terminals 415, and includes channels formed in an opposite, outer surface thereof for voltage sense wires 420. The cell straps 410 may be formed of a suitable material such as nickel, for example, although other conductive materials for cell straps 410 would be evident to one of ordinary skill in the art. Each voltage sense line 420 is in contact with a cell strap 410 at one end via a spring end 425, and is adapted to terminate as a round pin at the other end at an integrated connector 430 which is formed in the end cap 405. The round pins of the sense wires 420 within integrated connector 430 are thus configured to be connected to a female connector of a wiring harness that is connected to an electronics module (not shown) containing the battery pack electronics and/or intelligent devices with pack 1000.

Accordingly, an example method of configuring internal components within a battery pack for a cordless power tool, e.g., "end cap-to-end cap" may include loading the spring ends 425 of the sense wires 420 with spring ends 425 into the end caps 405, welding straps 410 to cells 402 of the pack in a fixture or jig (not shown) that temporarily keeps the cells together for welding, assembling end caps 405 with springs 425 to the welded "core pack" (the core pack can be understood as the cells 402 plus the straps 410) such that the straps 410 and cells 402 are retained within the end caps 405, thus forming the internal component arrangement 400. The jig is removed and the internal component arrangement 400 is assembled into the bottom housing 200.

An alternative method to configure internal components within pack 1000 includes providing the end caps 405, attaching the straps 410 and leads 415 within recesses of the end caps, loading the cells 402 within the end caps 405 and welding the straps 410 and leads 415 through accesses or holes in the end caps 405 to the can end surfaces of the cells 402 to form a core pack. The voltage sense wires 420 may then be inserted in channels in the outer surfaces of the end caps 405 of the core pack, with the spring ends 425 inserted through the end cap access holes to provide a pressure contact against the straps 410/cells 402, and with the round pin ends (first ends) of the voltage sense wires 420 attached within slots or channels of the integrated connector 430 (male). The formed internal component arrangement, or core pack, may then be positioned or inserted within the bottom housing 200.

As will be shown in more detail below in FIGS. 12 and 13, the electronics module 130 includes a potting boat 112 acting as a heat sink and housing a printed circuit board (PCB) 122 with the discrete components of the battery pack electronics thereon. The battery pack electronics may include a microcontroller configured to provide discharge control and protection against over-current, over-temperature and/or under-voltage fault conditions, voltage monitoring circuitry, internal power supply, temperature and current sensing circuitry and/or other sense components, serial data wires for external digital communications with a tool or charger, etc. The battery pack microcontroller is configured so as to exhibit control over an attached power tool or charger, for example, based on detected parameters and/or information received from the attached tool or charger. An example arrangement of battery electronic components or circuitry for battery pack 1000 is described in co-pending and commonly assigned U.S. patent application Ser. No. 11/552,832, filed Oct. 25, 2006, to David A. Carrier et al. and entitled "BATTERY PACK FOR CORDLESS POWER TOOLS", the entire contents of which are hereby incorporated by reference herein.

Once the internal component arrangement 400 has been assembled in bottom housing 200, the electronics module 130 (FIGS. 12, 13) may be attached to the core pack of arrangement 400 by routing thermistors, plugging in v-sense wiring harnesses, and soldering power wires, then placing the top housing 100 over the top of module 130/bottom housing 200. The top housing 100 may be secured to bottom housing 200 via fasteners such as screw 167 through aligned bosses 132/232, 134/234, 136/236, and the electronics module 130 may be secured to top housing 100 via screws (not shown) through apertures 142, which lifts the module 130 into its inverted position within the recessed area 140 inside upper portion 104 in FIG. 1. Each of these holes or bores formed by alignment of the bosses may include vibration dampening elements such as the grommets 165 shown in FIG. 17.

After the internal component arrangement 400 has been secured within the bottom housing 200, but before the top housing 100 with electronics module 130 is finally secured to form pack 1000 as described above, a latch spring and latch 150/release 155 is installed and positioned in the rear of bottom housing 200. Thereafter as described above, the electronics module 130 with potting boat is fixedly attached in an inverted orientation within the recessed area 140 in the upper portion 104 of top housing 100 via threaded fasteners (not shown) through apertures 142 (FIG. 3) that align with threaded through bores in the potting boat which holds the electronics module 130. Female connectors from one or more wiring harnesses of the electronics module 130 are then attached to corresponding male integrated connectors 430 in the end caps 405. Then, the top housing 100 is aligned with and attached to the bottom housing 200 and secured together through bosses 132/232, 134/234, 136/236 with suitable housing screws 167, for example.

FIG. 6 illustrates an end cap 405 in further detail. The end cap 405 may be shaped so as to receive the shape of the cells 402 and the number of serially connected cells, here shown as ten (10) series-connected cells in two parallel rows of five serially-connected cells. A given end cap 405 may be formed through a suitable, known injection molding process and/or by stamping processes, for example. For example, the end caps 405 may be formed of an injection molded PC/ABS. The end cap 405 includes an outer scalloped shape (shown generally at 407) that conforms generally to the shape of the cells 402, and includes a plurality of access holes 404, with a given access hole 404 corresponding to each cell.

As can be seen in FIG. 6, centrally located holes 408 may be provided for thermal sensing and management. In an example, holes 408 are provided for thermistors (not shown for clarity) to be inserted into the core pack of the internal component arrangement 400. Thermistors are configured on the ends of sense wires (not shown for clarity) from the module 130 to sense cell temperatures and report to the module 130. Additionally, recesses 406 may be pre-formed during fabrication of the end cap 405 and may serve to retain fitted connector straps 410 which will cover the access holes 404 on interior surfaces of the end caps 405, and be welded to the can enclosing the cell 402 through holes 404. At the top of end cap 405, there are formed raised projections 438 which abut ribbed extensions 138 (see FIG. 3) on the inside of the top housing 100, once the housing halves 100/200 are connected together. These raised projections 438 and ribbed extensions 138 are provided so that corresponding features in the top housing 100 clamp the core pack of arrangement 400 in proper alignment between the top and bottom housings 100, 200 when the top housing 100 is secured to the bottom housing 200. This restrains the core pack of arrangement 400 and aids in drop/vibration performance of the pack 1000. The slots of the integrated connector 430 may also be seen in FIG. 6.

The end caps 405 thus provide the glue that holds the battery pack 1000 internals together. The end caps 405 provide mechanical support for the components and locate the components relative to one another. Use of end caps 405 helps to locate and constrain cells 402 relative to one another, can provide a means to locate an electronics module relative to the cells, and can provide paths for signal lines to go between the electronics module and individual cells. The end caps 405 provide extra thermal mass for cell temperature management, provide an interface for dropping core pack of cells into a pack housing, and provide additional structural support under drop/impact conditions. Moreover, use of end caps 405 may simplify the manufacturing process, as the "backbone" of the internal component arrangement 400 not only exists in the finished product but also at subsequent assembly steps. Instead of using jigs and fixtures to keep the cells of the pack together before placing the cells into the housing, these end caps 405 are utilized early in the assembly process to maintain internal components together for subsequent processing steps in fabrication.

Further, the use of end caps 405 provides the flexibility to accommodate different cell form factors so as to accommodate different cell sizes within the same pack 1000. Many different battery manufacturers produce cells with roughly the same form factor. For Li-ion batteries, there are a few standard package sizes, including 26650 (cylindrical cell with diameter of approximately 26 mm and height of approximately 65 mm) and 18650 (cylindrical cell with diameter of approximately 18 mm and height of approximately 65 mm). While manufacturers typically hold to these outside dimensions, each manufacturer's cell is designed slightly different. The tolerances of these dimensions vary between makers, as well as features such as the vent design of the cell 402.

Use of end caps 405 may facilitate the use of cells 402 from many different vendors in a single pack design. By changing only the inside (core side) of the end cap design, different cells can be fit in. As long as the outside of the end caps 405 remains standard and/or does not change significantly as to outer dimensional size, cells 402 of differing dimensions can still fit into the same pack bottom housing 200.

Additionally, the bottom housing 200 and top housing 100 in FIGS. 3 and 4 have been designed to accommodate slight changes to the outside of the end caps 405. By changing the inside of the end caps 405 and making only minor modifications to the outer sides of the end cap 405, pack 1000 can handle many different cell designs. Changing the end cap tooling (creating a new mold or creating inserts or modifying the mold) might be the only change required to change cells, a relatively minor change in terms of costs, compared with changing all of the tooling for housings 100 and 200. Further, the end cap 405 is configured to have sufficient vents to accommodate a wide range of cell manufactures proprietary vent designs so as to allow for the release of any pressure building up in the cell.

Maintaining a relatively standard exterior end cap 405 design or form factor but changing the inside of the design for a particular cell configuration may offer a solution for accommodating many different cells and allowing for future flexibility as cell designs evolve.

FIG. 7A illustrates the attachment of the cell straps 410 and power terminal leads 415 to an inside surface of a given end cap 405. The cell straps 410 and power terminal leads 415 may be impressed within the recesses 406, prior to inserting the cells 402 in the end caps. Thus, the cell straps 410 and power terminal leads 415 'snap fit' into the recesses 406 of the end caps 405 for retention and proper location. The cell straps 410 and power terminal leads 415 may formed of a suitable well-known conductive material such as nickel, nickel-plated steel, aluminum (bare or nickel-plated), copper (bare or nickel plated, etc. As shown in FIG. 7A, each strap 410 has a centrally located slit 411 dividing a positive electrode leg from a negative electrode leg of the strap 410.

FIG. 7B illustrates an example construction of a cell strap with a jogged slit. Resistive welding is a conventional process by which cells in a power tool battery pack are connected together. Resistive welding is based on current being passed through a resistance and creating enough heat to flow the two materials together. Existing battery cells typically use a steel can construction. Newer battery techniques may utilize different cell construction materials, for example aluminum or copper. Copper and aluminum both have much lower resistivity than steel, which makes resistive welding a challenge. When a low resistance material, such as copper or aluminum, are resistively welded, a substantial amount of current on the order of several thousand amps (e.g., such as 1500-2000 A) is supplied to generate sufficient heat to complete the weld. This extra high level of current can cause problems with traditional cell strap designs.

FIG. 7B illustrates a cell strap configuration which may improve the use of resistance welding for welding highly conductive materials. The strap 710 in FIG. 7B utilizes protrusions to create reliable and clean points of contact between the strap and the aluminum or copper can of the cell. As compared to cell straps 410 in FIG. 7A, the length and shape of the slit 711 have been modified between the areas of the strap 710 that contact the positive and negative welding electrodes.

When creating a resistive weld there is a positive and a negative electrode that provides the current. The current needs to be directed through both materials. That is the purpose of the slit 711 in the strap 710. If the slit 711 were not present, the majority of the current flow would go directly between the electrodes in the top work piece (cell strap). Where the weld current is high, as in the case of aluminum or copper welding, the slit design should be configured to direct current through both work pieces (can and cell strap) instead of shorting across the top piece (cell strap). Accordingly, strap 710 has a jogged slit 711 to increase the slit length without reducing the cross-sectional area of the conductor in operation. The jogged slit 711 maximizes the distance that current needs to travel between the positive leg 712 and the negative leg 713 during welding of the strap 710 to the can of a cell 402 through access hole 404 (FIG. 6). This forces current to flow down into the cell 402 (bottom workpiece). The jogged slit 711 also maintains sufficient cross-sectional area so that the cell strap 710 can carry high levels of current.

Figure 8:
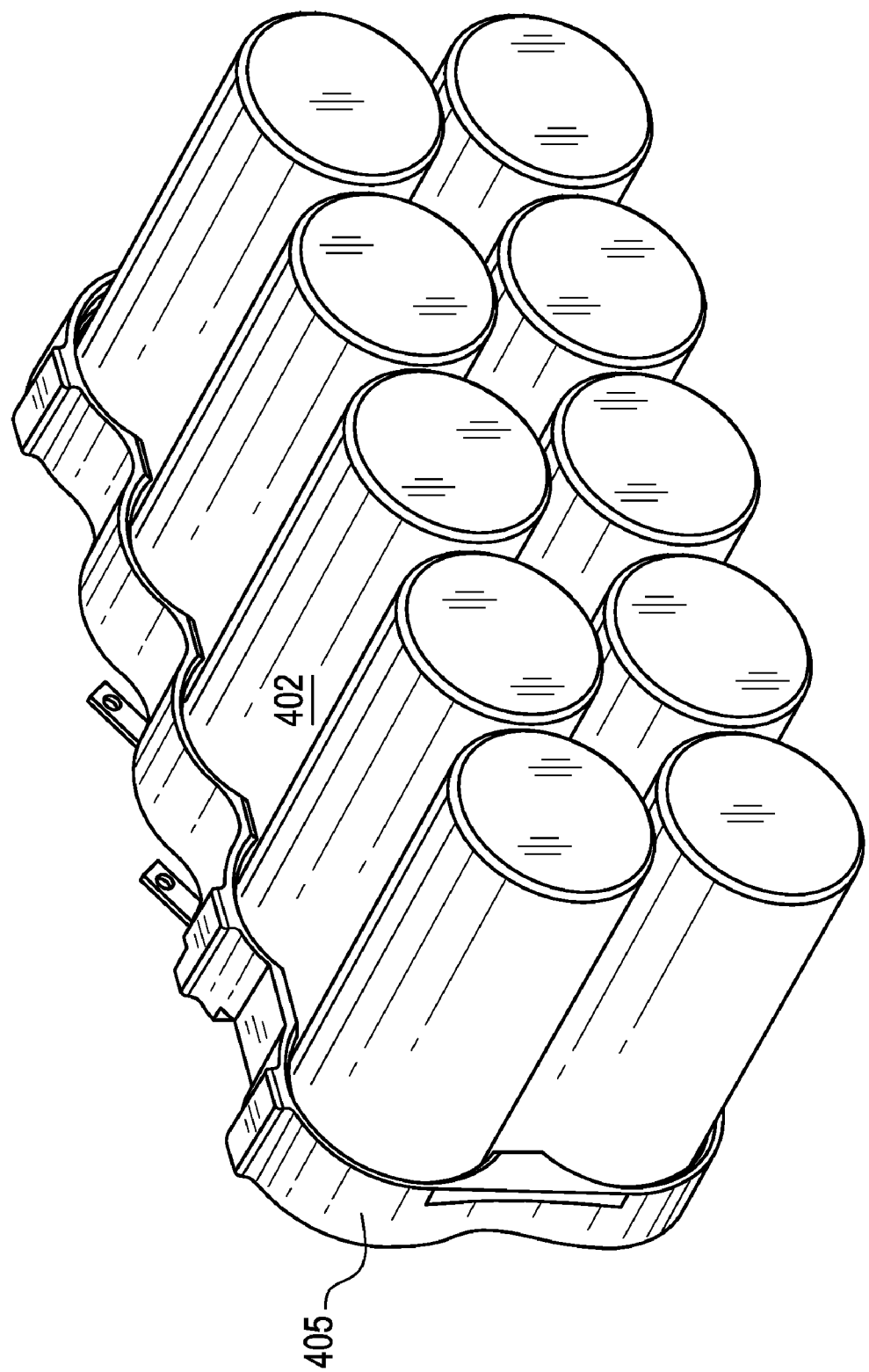
FIG. 8 illustrates the arrangement of battery cells within one of the end caps.

FIG. 8 illustrates the arrangement of battery cells 402 within one of the end caps. The cells 402 are inserted into the end caps 405, which locate and constrain the cells 402 relative to each other due in part to the arrangement of ribs 210, 215, 217 and 219. In this way, the end caps 405 become a structural support for a cluster of individual cells 402. The straps 410 and leads 415 will remain in position within the recesses 406 while cells 402 are positioned by other features of the end caps 405, such as the scalloped mirror image outer shape 407 of the end cap 405. Once the cells 402 are loaded between the end caps 405 so as to be in contact with the cells straps 410, the straps can be welded to the cans or enclosures enclosing the cells 402 through the access holes 404 in the end caps 405.

If the cans that house cells 402 are aluminum, laser welding may be used instead of ultrasonic or resistance welding. Conventional battery packs for power tools (NiMH and NiCd) typically are constructed by connecting, either in series or parallel, a group of NiMH or NiCd cells with a conductive cell strap that has been either ultrasonically welded or resistive welded. In one example, the battery pack 1000 described herein may include high power density (mass), Li-ion cells, which have a much higher power density as compared to NiMH or NiCd cells. To increase the power density (mass) even further, the aluminum cans are used to reduce the weight of the cell, where conventionally steel cans have been used for enclosing such cells.

When using Li-ion cells, it becomes difficult to use ultrasonic welding due to the thinner electrodes in the construction of the cylindrical cell 402. During welding, the energy from the ultrasonic weld can be translated into the electrode, causing damage and a potentially unsafe condition. In addition, when moving even further into the high power solution, and using an aluminum can as the housing around the cell jelly roll (spiral wound configuration) the resistive welding method becomes difficult because the electrical conductivity of aluminum is substantially high relative to its steel predecessor. As discussed above, resistive welding to cans made of high conductivity metals such as aluminum and copper is difficult because the energy needed to cause enough heat to melt the high conductivity material is substantial. Often times the energy used may be so high that it damages other portions of the pack or cell.

However, by using laser welding, both of the problems described above may be resolved. Laser welding the cell straps 410 to the cans of cells 402 does not translate energy into the delicate electrodes of the cell 402 via mechanical movement, such as would be the case when using ultrasonic welding. Laser welding does not require current to flow through a material to create heat, thus a high conductivity material such as aluminum can be welded to a low conductivity material such as steel or nickel. Accordingly, in an example where the cells 402 have an aluminum or copper can constructions, laser welding may be used to weld the cell straps 410 to the cans of cells 402.

In general, the welds formed at a strap 410 to cell 402 interface by either resistive or laser welding may represent the weak points in the arrangement 400 that can fail due to drop of the pack 1000 or due to vibration. These welds are particularly weak if the cell can is constructed with a highly electrically conductive material such as aluminum. During a drop of the battery pack 1000, as would be seen in a power tool battery environment, these welds can fail.

The failure mode is where the weld joint breaks when it is stressed when the cells move relative to one another. The typically rigid cell strap 410 that connects the cells 402 translates all of the relative motion (and therefore stress) to the relatively weak weld joint.

Accordingly, the straps 410 (and leads 415) described herein may be subjected to an annealing process that helps reduce the stress that the weld joint experiences during a drop of the pack 1000 and may thus prevent a product failure. In general, the ductility of the cell straps 410 can be increased by heat treating them. By using an annealed material, strength is traded for ductility. The added ductility allows the straps 410 to more easily deform when loaded, preventing stress from being translated to the welds. The annealing process can be performed on the raw material prior to stamping the strap 410, or can be conducted as a secondary process after stamping the strap 410 shape.

Alternatively, instead of annealing (heat treating) a harder material, such as a ½-hard nickel material or nickel plated steel, after stamping to improve ductility, annealing can be avoided by using a softer material for the cell straps 410. For example, a ¼-hard nickel material may be stamped into a strap 410 shape to achieve a desired ductility without subjecting the stamped metal to heat treatment.

Figure 9:
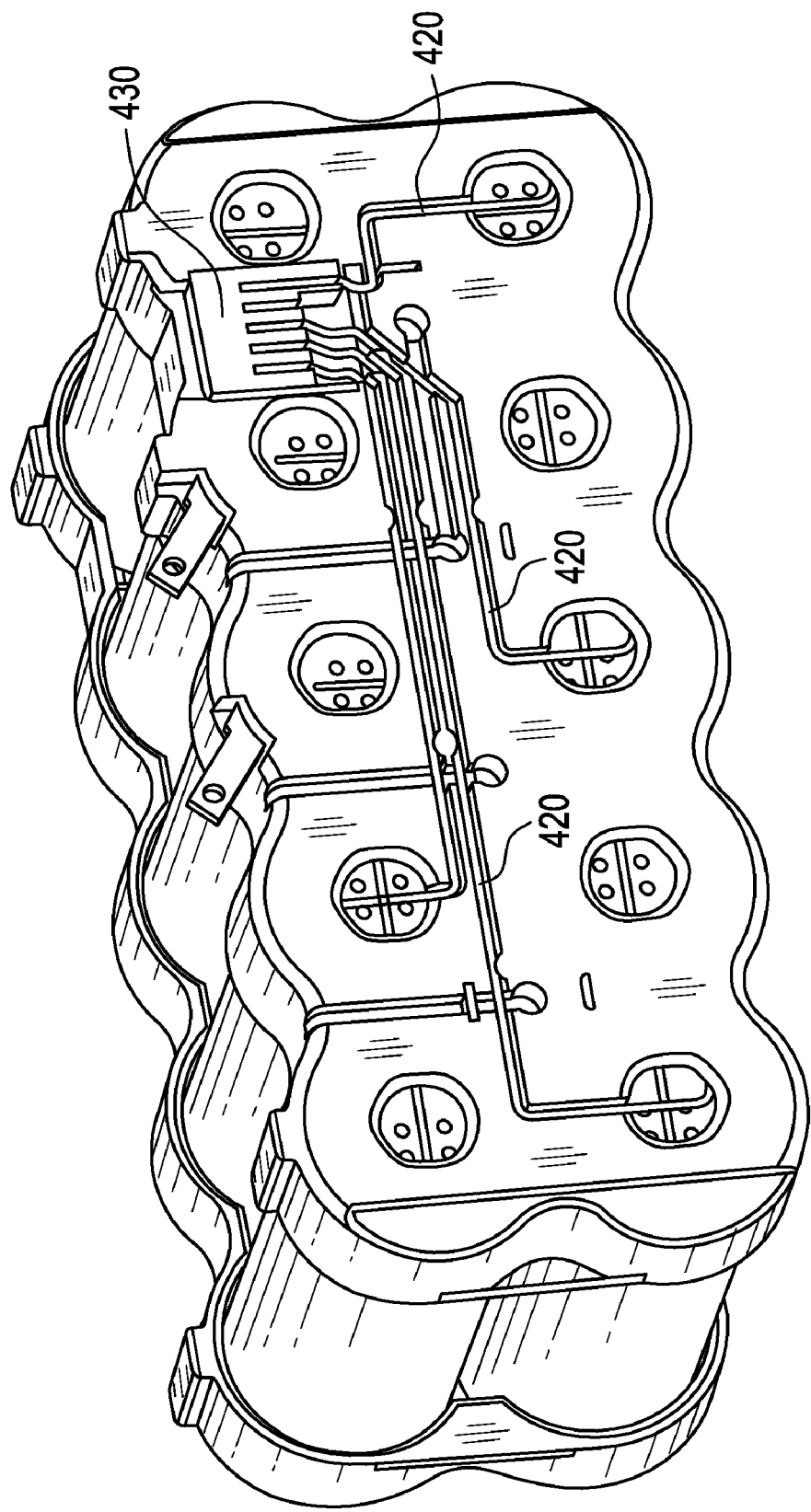
FIG. 9 shows the cells arranged between the end caps to illustrate various electrical conductors formed into an outer surface of a given end cap for electrical connection to an electronics module within the battery pack.
Figure 10A:
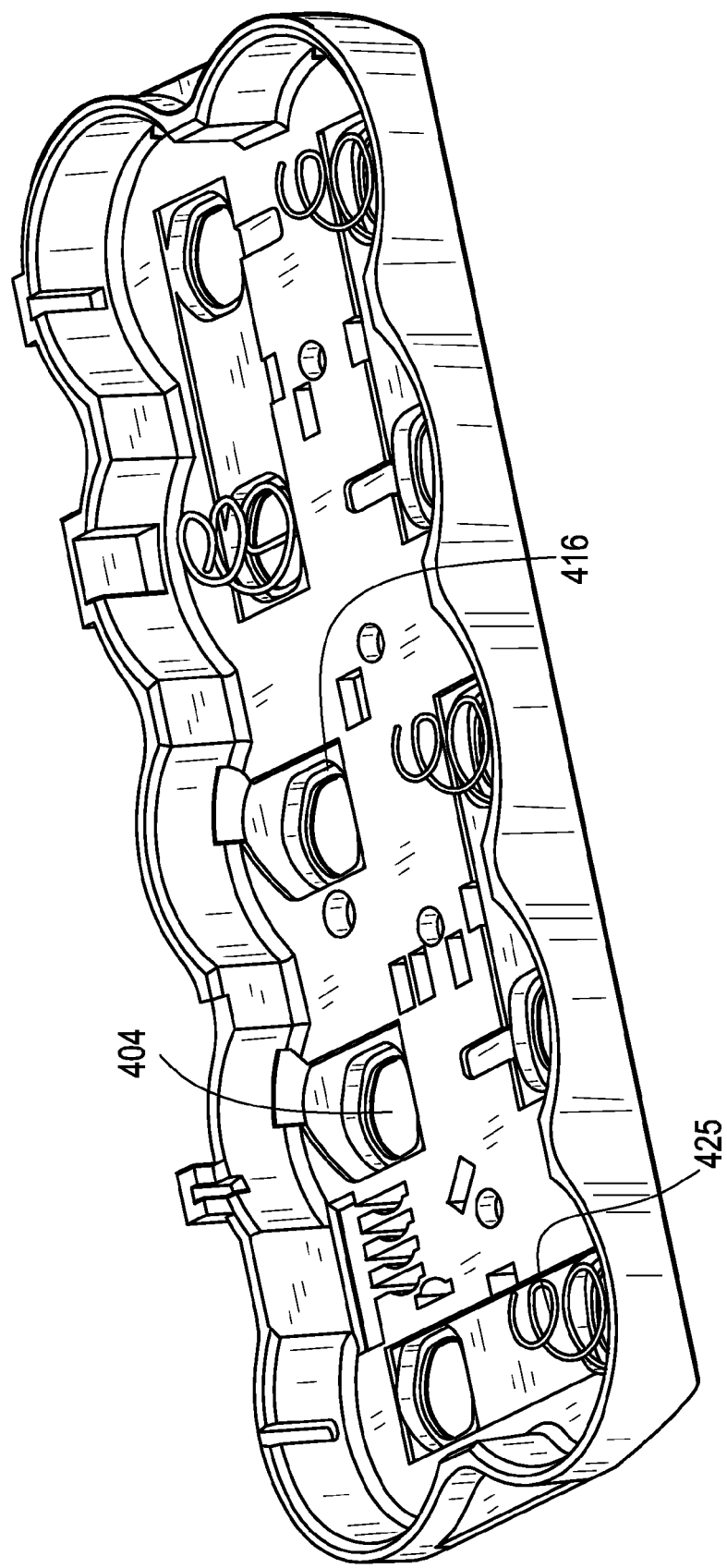
FIGS. 10A and 10B illustrate the arrangement of spring ends of the voltage sense wires between end surfaces of cans housing individual battery cells and a corresponding end cap.
Figure 10B:
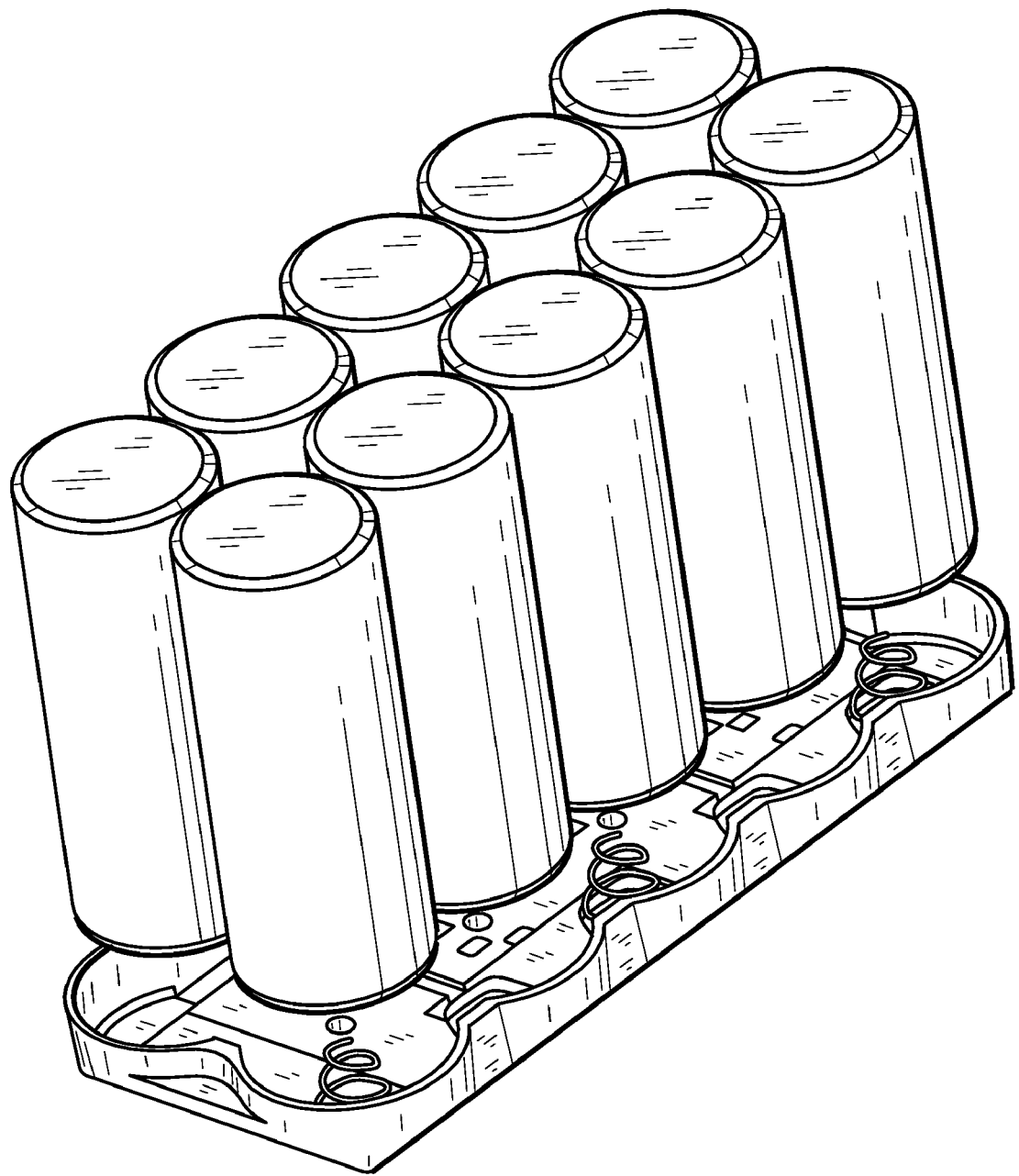
Figure 11:
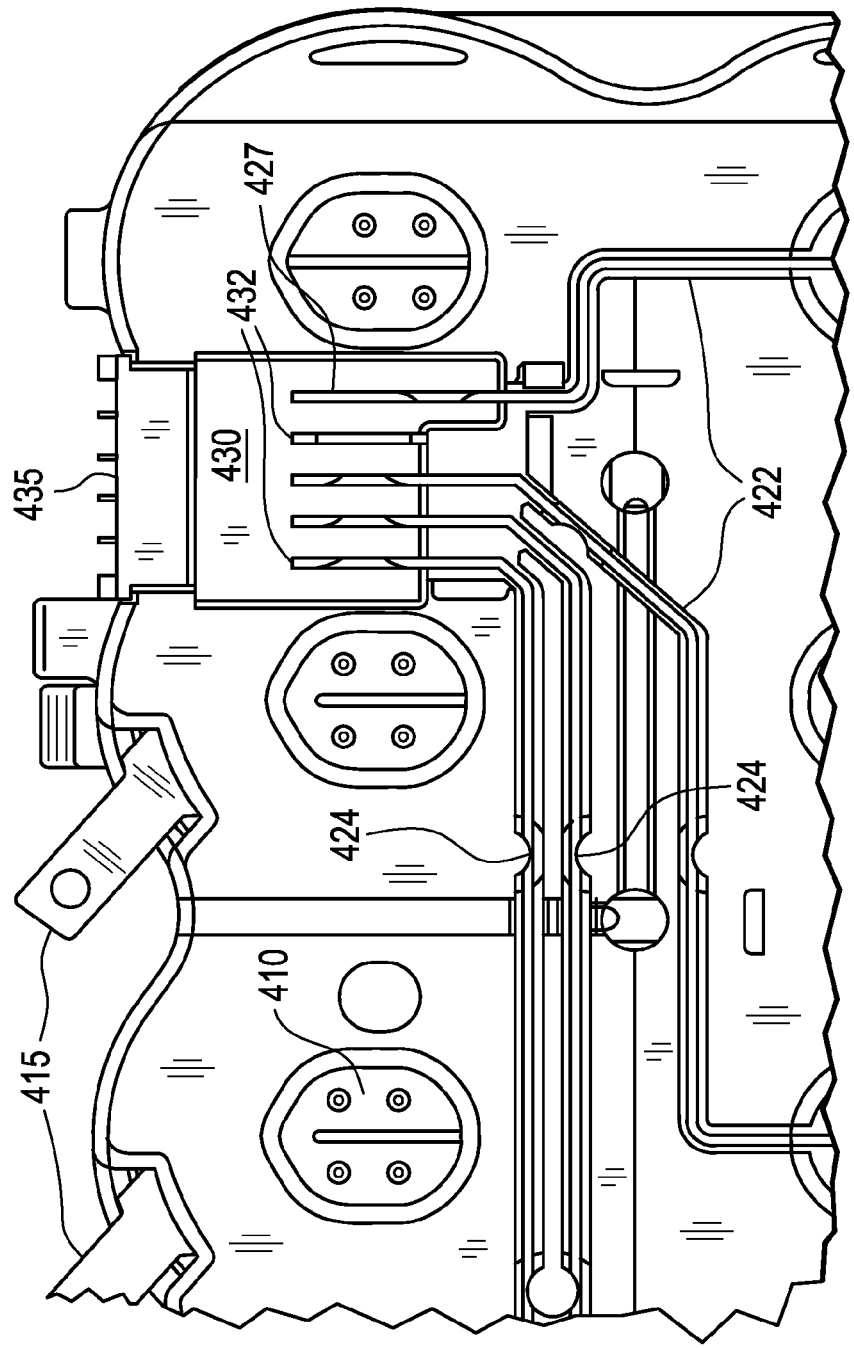
FIG. 11 is an enlarged view of an outer surface of an end cap illustrating the connection of voltage sense wires to the integrated connector.

FIG. 9 shows the cells arranged between the end caps to illustrate voltage sense wires provided in an outer surface of a given end cap for electrical connection to the electronics module of the battery pack; and FIGS. 10A and 10B illustrate an arrangement of spring ends of the voltage sense wires 420 between end surfaces of cans housing individual battery cells 402 and a corresponding end cap 405, it being understood that cell straps 410 have been removed for clarity and that the spring ends 425 actually contact cell straps 410. FIG. 11 is an enlarged view of an outer surface of an end cap 405 illustrating the connection of voltage sense wires to the integrated connector. FIGS. 10A and 10B show portion of the internal component arrangement removed so as to see the relationship between the spring ends 425 of the voltage sense wires and the end surfaces of the cells 402. FIGS. 9-11 should be referred to for the following discussion.

After the cells 402 have been welded to the cell straps 410 through access holes 404, the voltage sense wires 420 may be provided in the end caps 405. As discussed above, each cell 402 is to be wired up to the electronics module in pack 1000. It is desirable to use thin gage wire. However, as a power tool battery pack can experience high vibration in operation, this may lead to failure of thin gage wire that is soldered or ultrasonically welded (or otherwise rigidly attached) to the cells. FIGS. 9-11 illustrate an alternative method of voltage sensing that is more immune to failure from vibration or shock.

A solution is to employ a pressure contact instead of a rigid connection. Instead of soldering or ultrasonically welding stranded wire to a cell, a voltage sense line 420 having a spring end 425 is used to conductively touch the cell, as best shown in FIGS. 10A and 10B. The spring end 425 of the voltage sense line 420 could be formed of many different geometries and materials to fit the environment and provide the appropriate amount of contact surface area and pressure. In an example, the voltage sense line 420 may be steel wire that is wound into a helical compression spring at spring end 425.

As shown in FIG. 10A (which shows cells 402 and straps 410 removed for clarity), the spring ends 425 are inserted through access holes 404 and held by a chamfered retaining ridge 416 that holds the spring end 425 in place, once it is pushed through access hole 404. Since the cells 402 are already constrained between end caps 405 and have been welded to the cell straps 410, the spring end 425 is in contact with the cell strap 410/cell 402 junction through access hole 404. The spring end 425 (which may be a helical compression spring) compresses to touch the cell 402/strap 410 and make electrical contact. There is thus no rigid connection that can fail due to vibration. The 10-cell arrangement shown in the example embodiment has nine (9) spring end 425 connections to the cells 402, four spring ends 425 in one end cap 405 and five (5) spring ends 425 in the other end cap 405, for example. This is merely exemplary, it being understood that greater or fewer voltage sense wires 420 may be included depending on the number of cells 402 within the end caps 405.

FIG. 10B thus illustrates that the spring end 425 provides greater sense line surface area in contact with a cell 402, due to the compressive forces of the cell 402 on one side and the compressive forces of the end cap 405/bottom housing 200 on the other side of the spring end 425 due to it being retained by the chamfered retaining ridge 416, so that a voltage monitoring circuit in the electronics module 130 will always receive an accurate voltage reading from a cell 402 of interest.

In order to prevent corrosion from becoming an issue, the spring wire 425 can be made of stainless steel. Additionally the can end of cell 402 may be nickel plated to resist corrosion and maintain the surface conductivity of the components. The cell strap 410 may also be nickel plated such that the strap/cell junction where the contact of the stainless steel spring end 425 takes place is nickel. Components could also be gold or silver plated with the same effect. Use of a voltage sense line 420 with a spring end 425 as a pressure contact against the strap/cell junction eliminates the problems of soldering and ultrasonic welding that could likely lead to broken sense line connections in the field.

In an example, the sense wires 420 could be configured for temperature sensing instead of voltage sensing. In a further example, the end cap 405 could include preformed channels to receive signal level sense wires for both temperature sensing and voltage sensing.

Referring to FIG. 11, each end cap 405 has a plurality of pre-formed channels 422 that can receive a corresponding sense line 420. The sense wires 420 are fitted within the channels 422 and held securely therein by a series of pre-formed retainer tabs 424. The ends opposite the spring ends may be formed as rounded terminal pins 427 that may be inserted into slots 432 of the integrated connector 430. In FIG. 11, there is also shown a female connector 435 that may be fitted into connector 430, so as to connect sense wires 420 to a wiring harness (not shown) of the electronics module 130.

FIG. 12 is a partial view of the pack internals illustrating electrical connection between the end caps 405 and the electronics module. The use of voltage sense wires 420 with spring ends 425 provide certain benefits over other types of signal conductors, but there is not a standard method of connecting the sense wires 420 to the electronics module, shown generally in FIG. 12 as electronics module 130. The electronics module 130 is comprised of a potting boat 112 that acts as a heat sink and houses the battery pack electronics therein on a PCB 122 (not shown in FIG. 12). The potting boat 112 is attached to the T-block 110 so that terminals of T-block 110 are attached to electronic components on PCB 122. The potting boat 112 includes corner-located threaded through bores 113 for aligning with the corner module screw bosses 142 shown in FIG. 3. This permits the electronics module 130 to be attached up within recessed area 140 of the top housing 110, as shown in FIG. 3 and as to be shown in further detail below.

In order to terminate the signal-level (voltage or temperature sensing) wires 420 to the electronics module 130, the ends of the voltage sense wires 420 can be rounded so as to assimilate rounded pin conductors protruding out of integrated connector 430. There are commercially available connectors that use round pin conductors. Many commercially available, off-the-shelf connectors use square pins, but there are standard products that utilize round pins. One example of a round pin female connector is produced by Molex, Part # is 50-37-5053. Accordingly, a commercially available, standard round pin female connector 435 can be employed which mates with the integrated connector 430 formed in the end cap 405.

As shown best in FIG. 11 and with occasional reference to FIG. 13, the terminal ends 427 of the voltage sense wires 420 are thus configured as the round pins that mate with the female connector 435. The female connector 435 (shown on either side of module 130 as best shown in FIG. 13) is wired via a wiring harness 437 to the electronics module 130. Female connector 435 plugs into its corresponding end cap 405 at integrated connector 430 to connect the voltage sense signals from wires 420 to the electronics module 130, permitting the voltage sense wires 420 to be terminated in the PCB 122 of the electronics module 130.

FIG. 12 further illustrates that the end caps 405 may have openings or auxiliary vents 511 around an outer periphery thereof for additional thermal protection against overheat and/or to permit dispersal of gases.

FIG. 13 is a bottom view of top housing 100 so as to illustrate the arrangement of the electronics module 130 therein. As shown in FIG. 13, the potting boat 112 housing the PCB 122 of the electronics module 130 may be fitted within the recessed area 140 shown in FIG. 3, which is dimensioned so as to fittingly receive and fixedly secure the electronics module 130 therein.

In FIGS. 12 and 13, the electronics module 130 is shown inverted such that the potting boat 112 is received into the recessed area 140 and electronic components on PCB 122 face the cells 402, so that wires running from the cells 402 to the electronic module 130 may be routed directly. The inverted orientation may simplify the pack 1000 assembly and reduce the overall volume of the pack 1000.

For example, FIG. 13 illustrates the wiring harnesses 437 of the inverted PCB 122 within potting boat 112 and the connection to corresponding female connectors 435, which in turn connect to corresponding integrated connectors 430 of the end caps 405 (FIG. 12). The battery pack T-block 110 also fits into a wider end portion within top housing 100 (as shown most clearly by element 143 in FIG. 1) so that the electronics module 130 is fixedly secured up into the recessed area 140 by a plurality of fasteners connecting corner module screw bosses 142 to the potting boat 112 via through bores 113 (as best shown in FIG. 12).

The example embodiments of the present invention being thus described, it will be obvious that the same may be varied in many ways. In another example, the bottom housing 200 shown in FIG. 1 may include outer metal skin or metal sheeting portions affixed at bottom corners of the bottom housing 200. Alternatively, metal skin portions can be affixed to corners of both the top housing 100 and bottom housing 200. The metal skin portions may be produced from a stamped piece of sheet metal on the pack 100, for example, and are provided to absorb energy during a drop or impact. In other words, the metal skin portions act as bumpers or crumple zones, absorbing the energy before it is translated to vital components within pack 1000 such as the cells 402 or electronics module 130. Further, any dropping or impacting of the battery pack 1000 may place a higher stress and/or strain resistance internally within housings 100 and/or 200, and therefore, even if a crack is created in the top housing 100 or bottom housing 200, the metal skin protects and/or prevents the housings 100/200 from falling apart.

Such variations are not to be regarded as departure from the spirit and scope of the example embodiments of the present invention, and all such modifications as would be obvious to one skilled in the art are intended to be included within the scope of the appended claims herein.

What is claimed:

1. A battery pack for a cordless power tool, comprising:
   a top housing supporting an electronic module and a battery terminal block connected to the electronics module, and
   a bottom housing containing a plurality of battery cells constrained between a pair of end caps, wherein each end cap includes a plurality of voltage sense wires extending across an outer surface thereof and electrically connected between a corresponding cell and the electronics module.

2. The battery pack of claim 1, wherein each end cap includes an integrated connector receiving a first end of each sense wire for connection to a corresponding connector of a wiring harness that is attached to the electronics module so as to connect the sense wires to the module.

3. The battery pack of claim 2, wherein the first end of each sense wire is a rounded pin connector received within the integrated connector of the end caps so as to connect to a round pin female connector connected to the wiring harness.

4. The battery pack of claim 1, wherein each end cap has a plurality of recesses formed on an inner surface thereof, each recess containing either a cell strap or a power terminal lead therein for electrically connecting the cells to the electronics module.

5. The battery pack of claim 4, wherein the cell strap or power terminal lead contained are impressed within each of the recesses for connecting the cells to the electronic module.

6. The battery pack of claim 4, wherein one or more of the cell straps and power terminal leads contained within each recesses are composed of a first metal material that is subject to an annealing process to improve ductility, or composed a second metal material having a lower hardness but a higher ductility than the first material.

7. The battery pack of claim 4, wherein one or more of the cell straps has a jogged slit extending from an open end along a path having at least one angular directional change defining a positive leg and a negative leg therebetween.

8. The battery pack of claim 4, wherein each end cap includes a plurality of spaced access holes therethrough, and including a plurality of one of resistance welding and laser welding areas within each recess electrically connecting groups of cells or power terminal leads to the electronics module via the cell straps and power terminal leads.

9. The battery pack of claim 4, wherein
   each end cap includes a plurality of spaced access holes therethrough, and a plurality of welded areas each within a corresponding access hole connecting the cell strap or power terminal lead contained within each recess with groups of cells, and each sense line has a second coil spring end which extends through a corresponding access hole to be seated at a junction of a cell strap and battery cell exposed through the access hole so as to provide sensed data from the cell to the electronics module via the integrated connector.

10. The battery pack of claim 9, wherein a given sense line spring end is retained by a chamfered ridge formed around its corresponding access hole so that the spring end maintains contact with its cell/strap junction.

11. The battery pack of claim 10, wherein a given sense line spring end is compressed between a surface of its corresponding cell/strap junction and its corresponding chamfered ridge.

12. The battery pack of claim 9, wherein each sense line spring end is a pressure contact to a cell/strap junction so as to require no welding thereto.

13. The battery pack of claim 1, wherein each given sense line is constrained within a formed channel in the outer surface of its corresponding end cap.

14. The battery pack of claim 13, wherein each end cap includes a plurality of spaced-apart formed tabs extending along the length of each of the channels for securing the sense wires within corresponding channels of the end cap outer surface.

15. The battery pack of claim 1, wherein the electronics module comprises a potting boat housing a printed circuit board (PCB) with electronic components thereon, and wherein the potting boat serves as a heat sink for the electronics module.

16. The battery pack of claim 15, wherein the top housing includes an upper portion having an interior recessed area for receiving the electronics module, and the potting boat is secured in an inverted position within the interior recessed area so that electronic components on the PCB face down toward the battery cells.

17. The battery pack of claim 1, wherein each of the top housing and bottom housing have a plurality of screw bosses around a periphery thereof which align to provide bores for fasteners to secure the top and bottom housings together, and wherein one or more of the bores includes a vibration dampening component therein.

18. The battery pack of claim 1, wherein the top housing has a plurality of vents therein to provide heat dissipation from an interior of the pack to the exterior.

19. The battery pack of claim 1, wherein each end cap includes a plurality of vents along a periphery thereof to provide heat dissipation from the cells.

20. The battery pack of claim 1, wherein the battery pack includes a plurality of spaced apart ribs around an inner periphery on sidewalls of the bottom housing contacting the cells therein at multiple points of contact with the cells to spread loading on the cells due to vibration of the pack or a drop impact to the pack.

21. The battery pack of claim 1, wherein the battery pack includes a plurality of spaced apart separator ribs on an inner bottom surface of the bottom housing providing mechanical support to constrain the cells.

22. The battery pack of claim 1, wherein an interior surface of the top housing includes a plurality of ribbed extensions and each end cap includes a plurality of formed raised projections on an upper surface thereof which abut the ribbed extensions when the top and bottom housings are secured together.

23. The battery pack of claim 1, wherein only the end caps require re-tooling to accommodate different sized cells from differing manufacturers so that the bottom housing of the pack does not have to be retooled to accommodate the different cell sizes.

24. An internal component arrangement within a battery pack of a cordless power tool, the pack having a top housing and a bottom housing, comprising:

a plurality of battery cells disposed in the bottom housing,
a pair of end caps constraining the cells between inner surfaces of the end caps, and
a plurality of voltage sense wires extending across an outer surface of each end cap, each sense line having a first end electrically connected to an electronics module in the top housing and a second end electrically connected to a corresponding cell between the end caps.

25. The arrangement of claim 24, wherein each end cap has a plurality of recesses formed on an inner surface thereof, each recess containing either a cell strap or a power terminal lead impressed therein for electrically connecting the cells to the electronics module.

26. The arrangement of claim 24, wherein each end cap includes a plurality of spaced access holes there through, with the cell straps and power terminal leads being attached to the cells through corresponding access holes.

27. The arrangement of claim 26, further including a plurality of welded areas, each within a corresponding access hole, connecting by one of resistance welding and laser welding the cell straps and power terminal leads to the corresponding cells.

28. The arrangement of claim 26, wherein
each end cap includes a first connector receiving a first end of each of the sense wires for connection to a corresponding second connector attached to a wiring harness of the electronics module, and
each sense line has a second coil spring end which extends through a corresponding access hole to contact a given cell strap/battery cell junction so as to provide sensed data from a given cell to the electronics module via the first and second connectors and wiring harness.

29. The arrangement of claim 28, wherein each access hole includes a chamfered ridge around a circumference thereof, and each given spring end is retained by the chamfered ridge so that the spring end maintains contact with its corresponding cell strap/battery cell junction.

30. The arrangement of claim 24, wherein
each given sense line is constrained within a formed channel in the outer surface of its corresponding end cap, and
each end cap includes a plurality of spaced-apart formed tabs extending along the length of each of the channels for securing the sense wires within corresponding channels of the end cap outer surface.

31. A method of arranging a plurality of internal components within a battery pack housing, comprising:

providing a pair of end caps, each end cap having a plurality of spaced apart recesses formed on an inner surface thereof which are shaped to receive a plurality of cell straps and a pair of power terminal leads, each end cap having a plurality of spaced apart access holes which extend through a given recess, placing the cell straps and leads within the spaced apart recesses so that a portion of the cell strap or power lead is exposed through a corresponding access hole, disposing a plurality of cylindrical battery cells between the end caps so that ends of corresponding cells contact a given cell strap or lead at a junction that is exposed through a corresponding access hole, wherein sides of the end caps have a scalloped shape that conforms to the rounded shape of the cylindrical cells to constrain the cells there between, welding the cell straps and power leads to the cells through the access holes to form a core pack comprised of the cells connected to the straps and leads between the end caps, attaching a plurality of voltage sense wires within outer surfaces of the end caps in the core pack, wherein one end of each sense line is a spring end which is retained within a corresponding access hole of the core pack to contact a junction of a cell strap/battery cell, and the other end of each sense line is attached to a integrated connector formed in each end cap of the core pack, and inserting the core pack into the housing.

* * * * *